(12) United States Patent
Shirakami et al.

(10) Patent No.: US 11,507,660 B2
(45) Date of Patent: Nov. 22, 2022

(54) INFORMATION PROCESSING APPARATUS, NON-TRANSITORY COMPUTER-READABLE STORAGE MEDIUM, AND CYBER EXERCISE CONTROL METHOD

(71) Applicant: FUJITSU LIMITED, Kawasaki (JP)

(72) Inventors: Kazuhisa Shirakami, Machida (JP); Koji Mikami, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 217 days.

(21) Appl. No.: 17/133,907

(22) Filed: Dec. 24, 2020

(65) Prior Publication Data
US 2021/0240824 A1 Aug. 5, 2021

(30) Foreign Application Priority Data

Jan. 30, 2020 (JP) .............................. JP2020-013608

(51) Int. Cl.
*G06F 21/56* (2013.01)
(52) U.S. Cl.
CPC ........ *G06F 21/56* (2013.01); *G06F 2221/034* (2013.01)
(58) Field of Classification Search
CPC ............... G06F 21/56; G06F 2221/034; G06F 2221/033; G06F 21/57; H04L 63/1433
See application file for complete search history.

(56) References Cited

U.S. PATENT DOCUMENTS

| | | | |
|---|---|---|---|
| 10,757,132 B1* | 8/2020 | Powers | G06Q 10/06398 |
| 2009/0320137 A1* | 12/2009 | White | H04L 63/1433 |
| | | | 707/999.102 |
| 2016/0155343 A1 | 6/2016 | Hayakawa | |
| 2017/0169230 A1* | 6/2017 | Zheng | G06N 20/00 |
| 2018/0096153 A1* | 4/2018 | DeWitte | G06F 21/56 |
| 2021/0226980 A1* | 7/2021 | Riccetti | H04L 63/1433 |

FOREIGN PATENT DOCUMENTS

| | | |
|---|---|---|
| JP | 2014-191466 A | 10/2014 |
| JP | 2016-102833 A | 6/2016 |
| WO | 2017/126041 A1 | 7/2017 |

* cited by examiner

*Primary Examiner* — Ali S Abyaneh
(74) *Attorney, Agent, or Firm* — Fujitsu Patent Center

(57) ABSTRACT

An information processing apparatus includes a memory and a processor. The processor coupled to the memory and configured to receive information indicating a plurality of program components used to execute a cyber exercise and a relationship between the plurality of program components, and generate a program group included in a scenario that controls execution of the cyber exercise by combining the plurality of program components based on the information indicating the relationship.

4 Claims, 35 Drawing Sheets

FIG. 9

```
"START ACCESS TO DRINKING FOUNTAIN:01":{
    "comment:"START ACCESS TO DRINKING FOUNTAIN",
    "trigger": "Start",
    "nextEvent": [
      {
        "eventName": "Blue:01:01:03"
      }
    ]
},
```
— A

```
"START ACCESS TO DRINKING FOUNTAIN:02":{
"comment":"DEMONSTRATION INTRODUCTION COMMENT COMPLETION",
    "trigger": "Blue:01:01:02",
    "nextEvent": [
      {
        "eventName": "Blue:01:01:03"
      }
    ]
},
```
— B

```
"START ACCESS TO DRINKING FOUNTAIN:03":{
"comment": "WAIT FOR DEMONSTRATION INTRODUCTION COMMENT COMPLETION",
    "trigger": "Blue:01:01:03",
    "kind": "All",
    "triggerConditions": {
      "Event.Start": true,
      "Event.Blue:01:01:02": true
    },
    "nextEvent": [
      {
        "eventName": "Blue:01:01:04"
      }
    ]
},
```
— C

FIG. 29

```
> CyberExercise > create > START ACCESS TO DRINKING FOUNTAIN
 1  Edit Attribute "Contents"
 2  #
 3  # ACCESS TO DRINKING FOUNTAIN BY IE
 4  # COPYRIGHT FUJITSU SYSTEM INTEGRATION LABORATORIES LIMITED 2018
 5
 6  # READ COMMON FUNCTION EXTERNAL FILE
 7  $ownpath = Split-Path -Parent $MyInvocation.MyCommand.Path
 8  ."$ownpath¥modules¥PowerShell¥CommonWindows.ps1"
 9
10  # IE EXECUTION FILE PATH
11  $IE = "C:¥Program Files¥internet Explorer¥iexplore.exe"
12  Write-Host "IE : $IE"
13
14  # ACTIVATE IE
15  $process = ExecuteApplication $IE
16  Write-Host "***** ACTIVATE IE : <$process>"
17  Start-Sleep -s 5
18
19
20  # Windows SECURITY DIALOG - CLICK [OK] BUTTON (USER NAME/USE PASSWORD STORAGE)
21  $dialog = GetWindowObject "Windows SECURITY"
22  if ($dialog -ne $NULL) {
23      $ret =ClickButtonWinObj $dialog "OK"
24      Write-Host "***** SkyDocs USER NAME/INPUT PASSWORD : <ret>"
25      Start-sleep -s 2
26  }
27
28  # Windows Internet Explorer 8 SETUP - CLICK [CONFIRM LATER (A)] BUTTON
29  $dialog =GetWindowObject "Windows Internet Explorer 8 SETUP
30  Write-Host "***** Windows SECURITY DIALOG : <$dialog>"
31  if ($dialog =ne $NULL) {
32      $ret =ClickButtonWinObj $dialog "CONFIRM LATER"
33      Write-Host "***** SKIP IE SETUP SCREEN : <$ret>"
34      Start-Sleep -s 2
35  }
36
37  # ACQUIRE WINDOW OBJECT WITH PROCESS SPECIFICATION
```

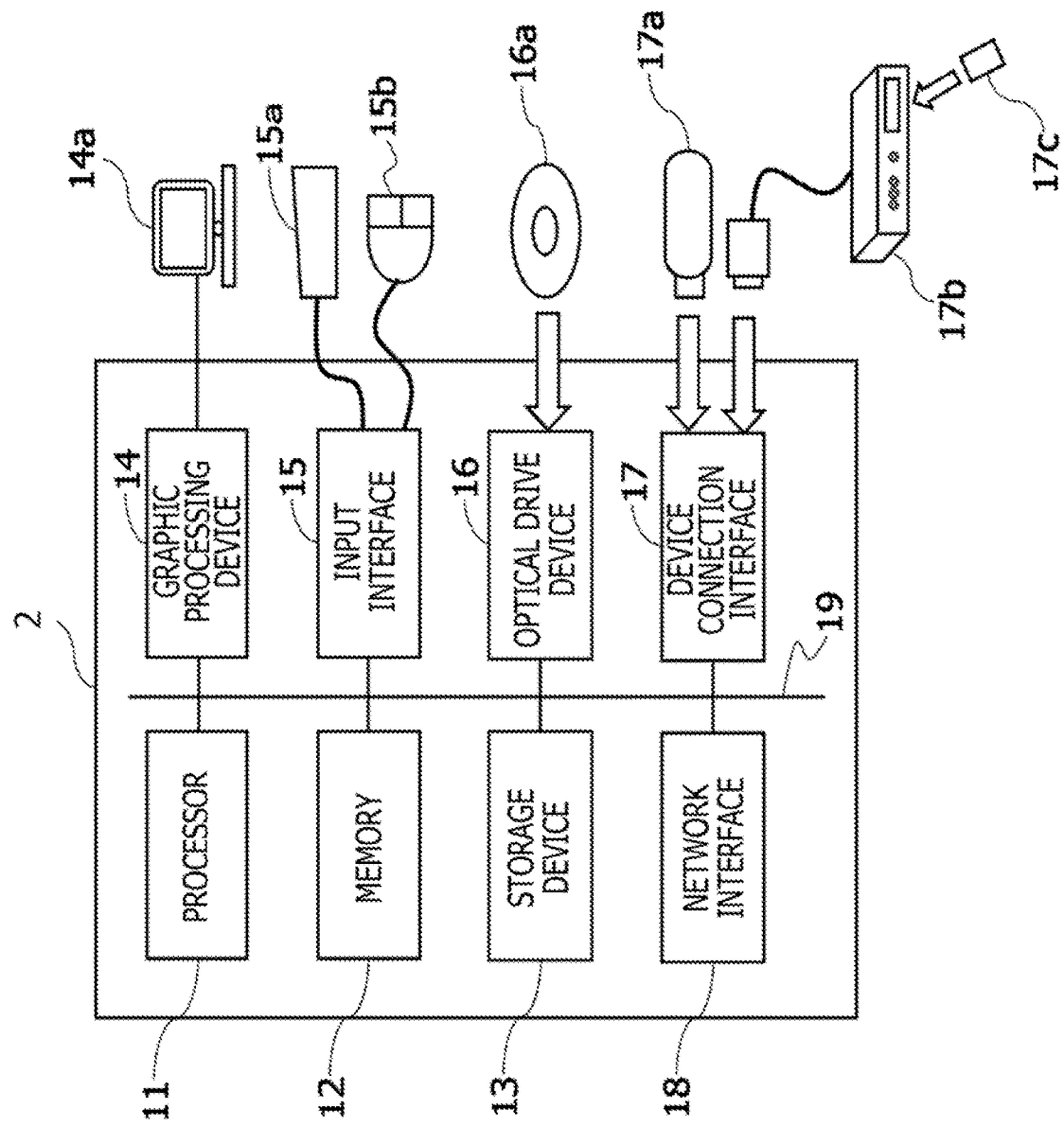

INFORMATION PROCESSING APPARATUS, NON-TRANSITORY COMPUTER-READABLE STORAGE MEDIUM, AND CYBER EXERCISE CONTROL METHOD

CROSS-REFERENCE TO RELATED APPLICATION

This application is based upon and claims the benefit of priority of the prior Japanese Patent Application No. 2020-13608, filed on Jan. 30, 2020, the entire contents of which are incorporated herein by reference.

FIELD

The present embodiment discussed herein is related to an information processing apparatus, a non-transitory computer-readable storage medium, and a cyber exercise control method.

BACKGROUND

It has been known that a cyber exercise is executed in order to respond to a cyber attack of which a target is a computer system.

By repeatedly performing the cyber exercise in an environment simulating a cyber space, it is possible to confirm capabilities of responding personnel, status reporting method and procedure, a person in charge, functionality of a command instruction, and validity and effectiveness of a response plan, and it is possible to improve skills.

When the cyber exercise is performed, an exercise scenario (Master Scenario Events List: MSEL) is created in advance in which when and where, who carries out what kind of events and what kind of actions are expected are written.

Japanese Laid-open Patent Publication Nos. 2014-191466 and 2016-102833, and International Publication Pamphlet No. WO 2017/126041 are disclosed as related art.

SUMMARY

According to an aspect of the embodiments, an information processing apparatus includes a memory; and a processor coupled to the memory and configured to: receive information indicating a plurality of program components used to execute a cyber exercise and a relationship between the plurality of program components, and generate a program group included in a scenario that controls execution of the cyber exercise by combining the plurality of program components based on the information indicating the relationship.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram for explaining the method of creating the scenario definition file in the exercise builder as an example of the embodiment;

FIG. 29 is a diagram illustrating a script description screen of the exercise builder as an example of the embodiment;

FIG. 35 is a diagram illustrating a hardware configuration of the exercise builder as an example of the embodiment.

DESCRIPTION OF EMBODIMENTS

Figure 1:
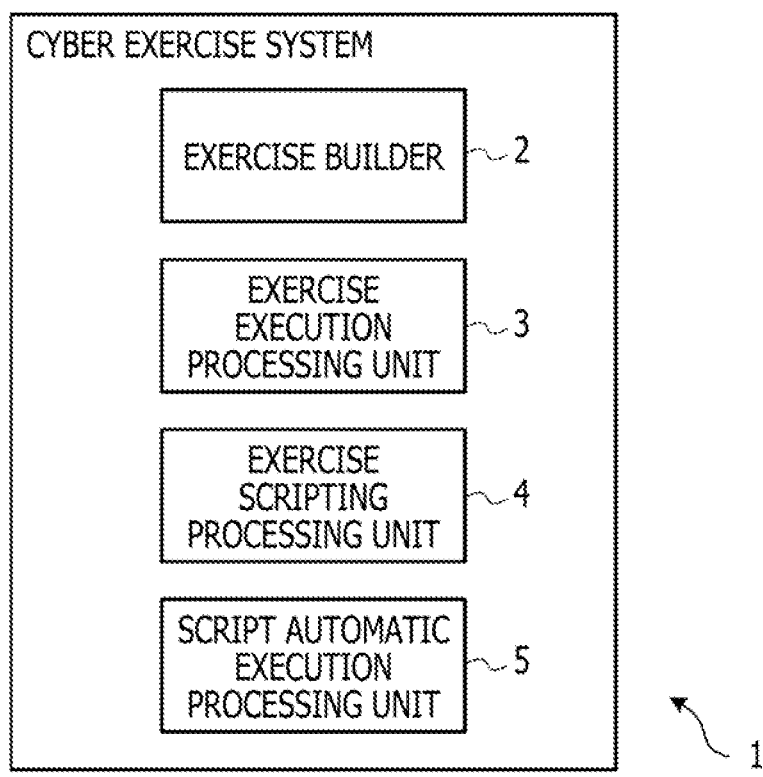
FIG. 1 is a diagram illustrating a functional configuration of a cyber exercise system including an exercise builder as an example of an embodiment.

The typical examples have problems that creation of an exercise scenario used to perform a cyber exercise needs a huge amount of effort. Furthermore, there is also a problem that it is not possible to easily change the configuration of the exercise scenario that has been created once and it is difficult to reuse a part of the exercise scenario.

Therefore, an object of an aspect of the present embodiment is to easily edit a cyber exercise scenario.

Hereinafter, embodiments of this program, an information processing apparatus, and a cyber exercise control method will be described with reference to the drawings. However, the embodiment to be described below is merely an example, and there is no intention to exclude application of various modifications and techniques not explicitly described in the embodiment. For example, the present embodiment can be variously modified (combining embodiment and each of modifications, for example) without departing from the spirit of the present embodiment. Furthermore, each drawing is not intended to include only the components illustrated in the drawing, and may include other functions or the like.

(A) Configuration

FIG. 1 is a diagram illustrating a functional configuration of a cyber exercise system 1 including an exercise builder 2 as an example of an embodiment.

The cyber exercise system 1 realizes a cyber exercise and includes a plurality of computers (terminal) operated by participants (exercising person) of the cyber exercise. The cyber exercise system 1 includes an information processing apparatus (first information processing terminal) on an attack side in the cyber exercise and an information processing apparatus (second information processing terminal) on a defense side in the cyber exercise.

As illustrated in FIG. 1, the cyber exercise system 1 includes functions as the exercise builder 2, an exercise execution processing unit 3, an exercise scripting processing unit 4, and a script automatic execution processing unit 5.

The exercise execution processing unit 3 executes a cyber exercise by using a cyber exercise scenario created by the exercise builder 2 to be described later. Hereinafter, the cyber exercise scenario may be simply referred to as a scenario or may be simply referred to as an exercise.

The exercise scripting processing unit 4 converts an operation performed by the exercising person of the cyber exercise executed by the exercise execution processing unit 3 into a script and embeds the operation into a component. As a result, by automatically executing the script embedded in the component in a next or subsequent exercises, the operation performed by the exercising person is automatically performed.

For example, this makes it possible to execute an exercise on the defense side by automatically performing an attack-side operation and also to, conversely, execute an exercise on the attack side by automating a defense-side operation. Furthermore, only a part desired to be exercised may be manually executed, and all the other processing may be automatically executed.

The script automatic execution processing unit 5 monitors a status of each terminal included in the cyber exercise system 1 and notifies the other terminal of an occurrence of an event in a case where event occurrence conditions are satisfied. Furthermore, the script automatic execution processing unit 5 automatically executes the script according to the event notified from the other terminal.

The exercise builder 2 makes a cyber exercise scenario creator design a cyber exercise and creates a scenario of the designed cyber exercise (cyber exercise scenario). Hereinafter, the cyber exercise scenario creator may be referred to as an operator. The exercise builder 2 realizes functions such as creation of exercise text, creation of an exercise environment (cyber range), or output of scenario data to be automatically executed used to assist exercise execution. The exercise builder 2 may include, for example, an information processing apparatus having a server function.

Figure 2:
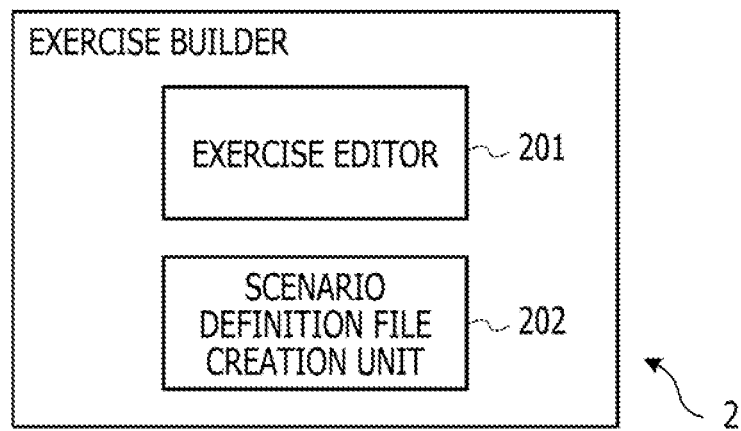
FIG. 2 is a diagram illustrating a functional configuration of the exercise builder as an example of the embodiment.

FIG. 2 is a diagram illustrating a functional configuration of the exercise builder 2 as an example of the embodiment.

As illustrated in FIG. 2, the exercise builder 2 includes an exercise editor 201 and a scenario definition file creation unit 202.

The exercise editor 201 creates a cyber exercise scenario by making the operator design a cyber exercise.

The exercise editor 201 displays an exercise modeling screen 140 (refer to FIG. 3 or the like) on a monitor 14a (refer to FIG. 35) included in the cyber exercise system 1, and the operator inputs the design of the cyber exercise on the exercise modeling screen 140. The exercise editor 201 stores information input on the exercise modeling screen 140 in a predetermined storage region such as a memory 12 and a storage device 13 (refer to FIG. 35) as a cyber exercise scenario model.

The exercise editor 201 includes a function as a display control unit that displays the exercise modeling screen 140 on the monitor 14a. Furthermore, the exercise editor 201 includes a function as an input processing unit that processes the input operation performed by the operator on the exercise modeling screen 140.

Figure 3:
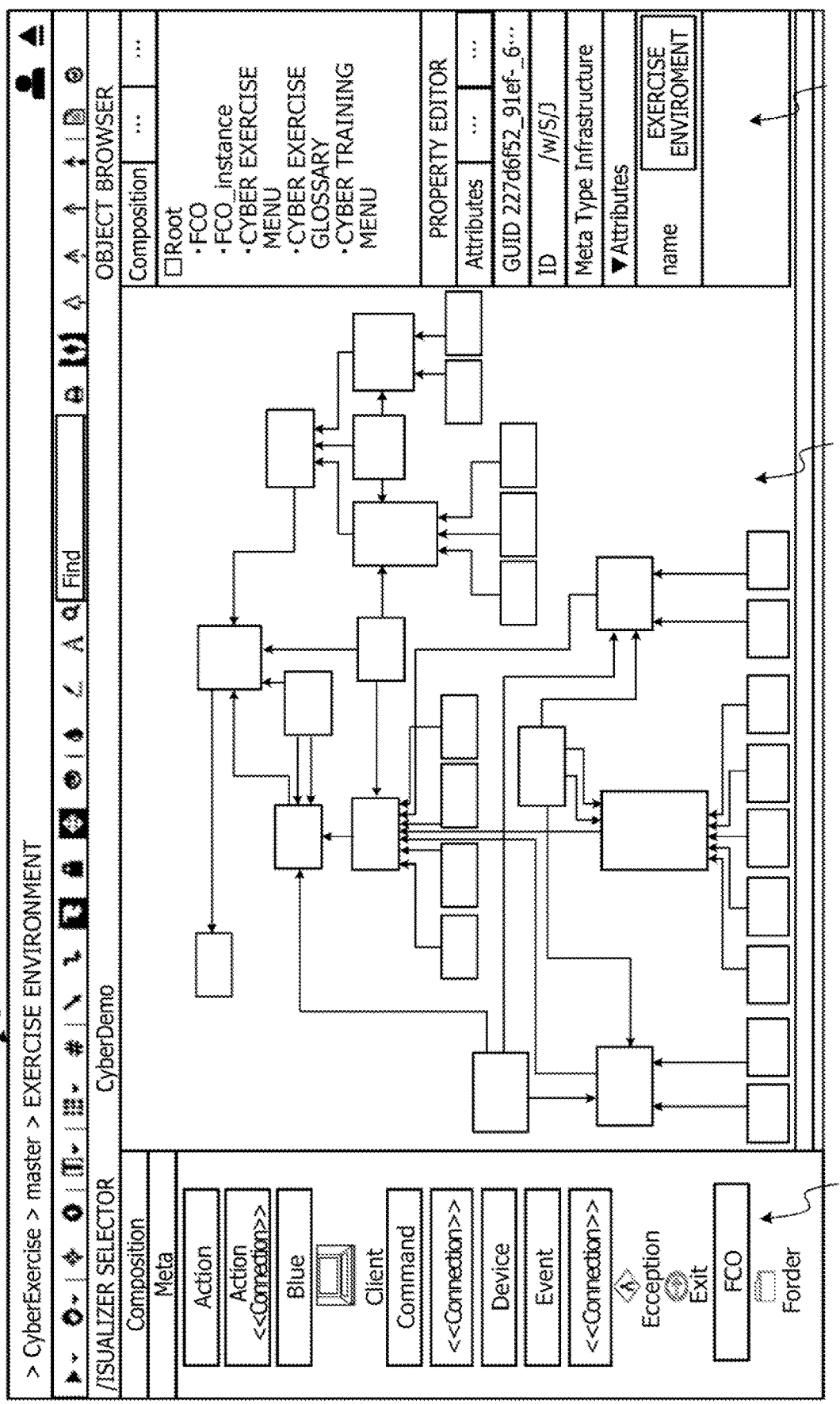
FIG. 3 is a diagram illustrating an exercise modeling screen of the exercise builder as an example of the embodiment.

FIG. 3 is a diagram illustrating the exercise modeling screen 140 of the exercise builder 2 as an example of the embodiment and is an edition screen used to define a component to be arranged in the scenario.

The exercise modeling screen 140 illustrated in FIG. 3 includes a work region 141, a component display region 142, and an information display region 143.

Various events included in the cyber exercise are displayed in the component display region 142 as the components (program component). In the example illustrated in FIG. 3, the event component is indicated by a rectangular icon. The operator designs the cyber exercise by selecting the event component displayed in the component display region 142 and arranging the selected component in the work region 141.

The events in the cyber exercise include, for example, a phase (exercise phase), a scene (exercise scene), an event, a trigger, an action, and a waiting time. These events may be hierarchically configured. For example, the phase may be configured by combining the plurality of scenes. Furthermore, the scene may be configured by combining the plurality of actions.

The work region 141 is a region where the events selected by the operator, a computer element, or the like are arranged and displayed.

The operator arranges the component displayed in the component display region 142 in the work region 141 by operating a mouse 15b or a keyboard 15a (refer to FIG. 35). For example, the operator arranges the component displayed in the component display region 142 in the work region 141 by dragging and dropping the component.

The operator designs the cyber exercise by arranging the components in the work region 141 by using the functions of the exercise editor 201. Furthermore, the operator expresses a relationship such that the scene exists in the phase and the event exists in the scene, by connecting these components by lines.

The information display region 143 is a region where information regarding the component arranged in the work region 141 and the like are displayed. Furthermore, in the information display region 143, the information regarding the component arranged in the work region 141 may be edited.

In a case of determining that the exercise needs a phase in addition to an event and a scene, the operator additionally defines a phase component in the work region 141. Then, this makes it possible to use a component that can be phase dragged and dropped on an exercise modeling screen 140 (exercise modeling screen 140a) illustrated in FIG. 4.

In the following example, an example in a case where an exercise has a hierarchical structure of phase—scene—event is indicated.

Figure 4:
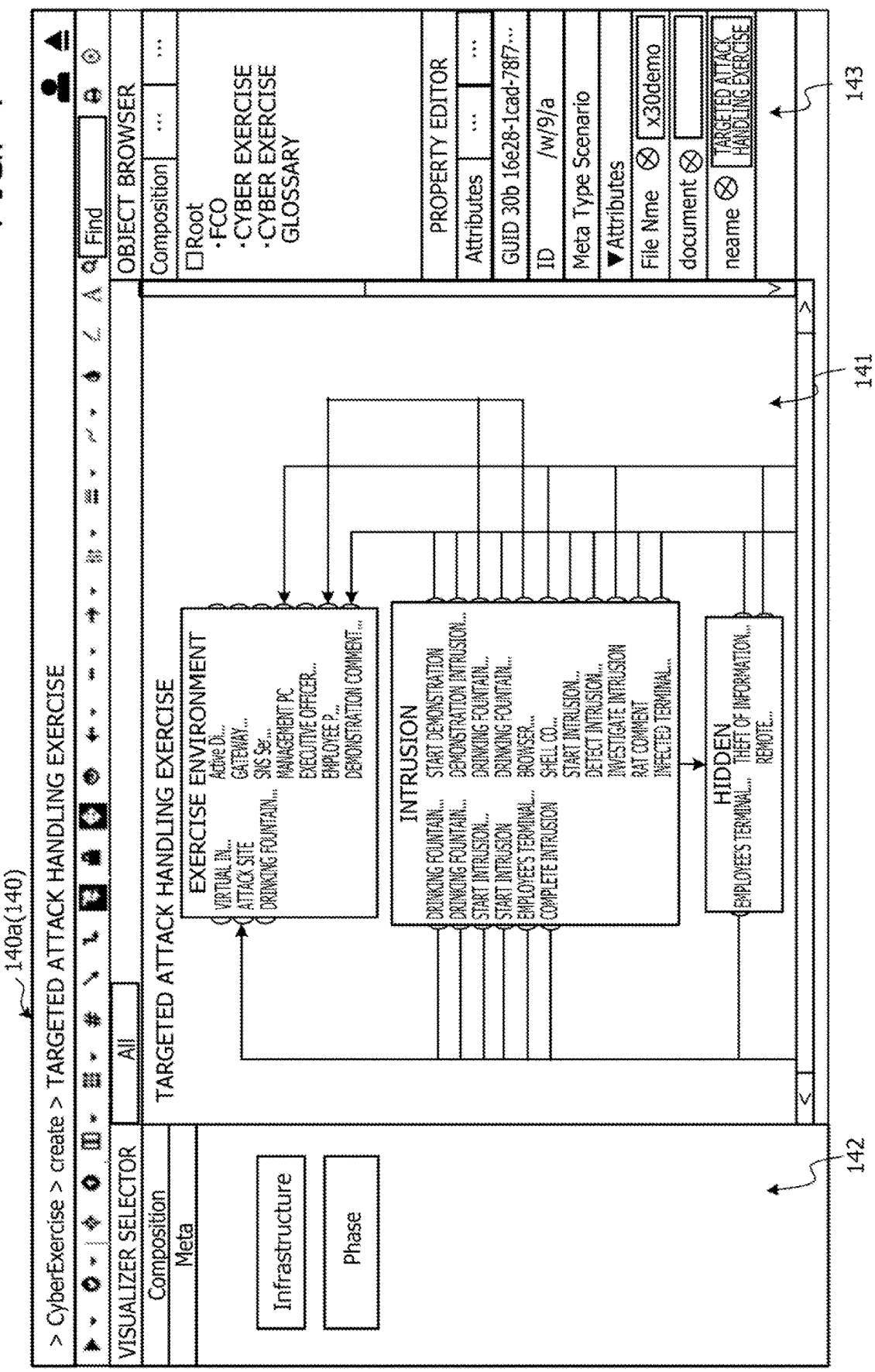
FIG. 4 is a diagram illustrating an exercise modeling screen of the exercise builder as an example of the embodiment.

After selecting the component to be included in the exercise scenario on the exercise modeling screen 140 illustrated in FIG. 3, the operator designs a phase on the exercise modeling screen 140a illustrated in FIG. 4.

FIG. 4 is a diagram illustrating the exercise modeling screen 140 of the exercise builder 2 as an example of the embodiment and illustrates the exercise modeling screen 140a for phase design. Hereinafter, note that, because the reference numeral in the drawings which is the same as the reference numeral described above indicates the similar part, the description thereof is omitted. Hereinafter, the exercise modeling screen for phase design of the exercise modeling screen 140 may be, for example, denoted with a reference numeral 140a.

In the example illustrated in FIG. 4, an exercise environment and an exercise phase are illustrated in the exercise modeling screen 140a for the phase design, and "intrusion" and "hidden" are illustrated as the phases in the cyber exercise.

The operator designs the phase by selecting the components indicating the phases from the component display region 142 and arranging the selected components in the work region 141 on the exercise modeling screen 140a. A phase name (component name) displayed for each component in the work region 141 may be set by the operator by using the mouse 15b, the keyboard 15a, or the like or may be set by the exercise builder 2.

Furthermore, in the example illustrated in FIG. 4, the phase components arranged in the work region 141 are connected by connection lines. The connection line represents a flow of the exercise. For example, after the single phase is terminated, a phase connected to the phase by the connection line is executed. The connection line may be set by the operator by using the mouse 15b, the keyboard 15a, or the like or may be set by the exercise builder 2.

The setting of the connection line includes setting of a connection direction, for example, setting of a connection source and a connection destination. Between two components connected by the connection line, a connection source component is positioned on the upstream (upper) side of the processing, and a connection destination component is positioned on the downstream (lower) side of the processing. The connection line corresponds to information indicating a relationship between the plurality of components.

The exercise editor 201 includes a function as a setting unit that sets the cyber exercise scenario model (model information) that sets the plurality of components respectively corresponding to the plurality of events (phase, scene, event, and action) included in the cyber exercise and the connection line indicating the relationship between the plurality of components.

The exercise editor 201 stores the information (phase name or the like) of the component of each phase arranged in the work region 141 and the information regarding the connection line in the predetermined storage region such as the memory 12 or the storage device 13. For example, the exercise editor 201 includes a function as a storage control unit that stores the cyber exercise scenario model (model information) in the storage unit (memory 12 and storage device 13).

Figure 5:
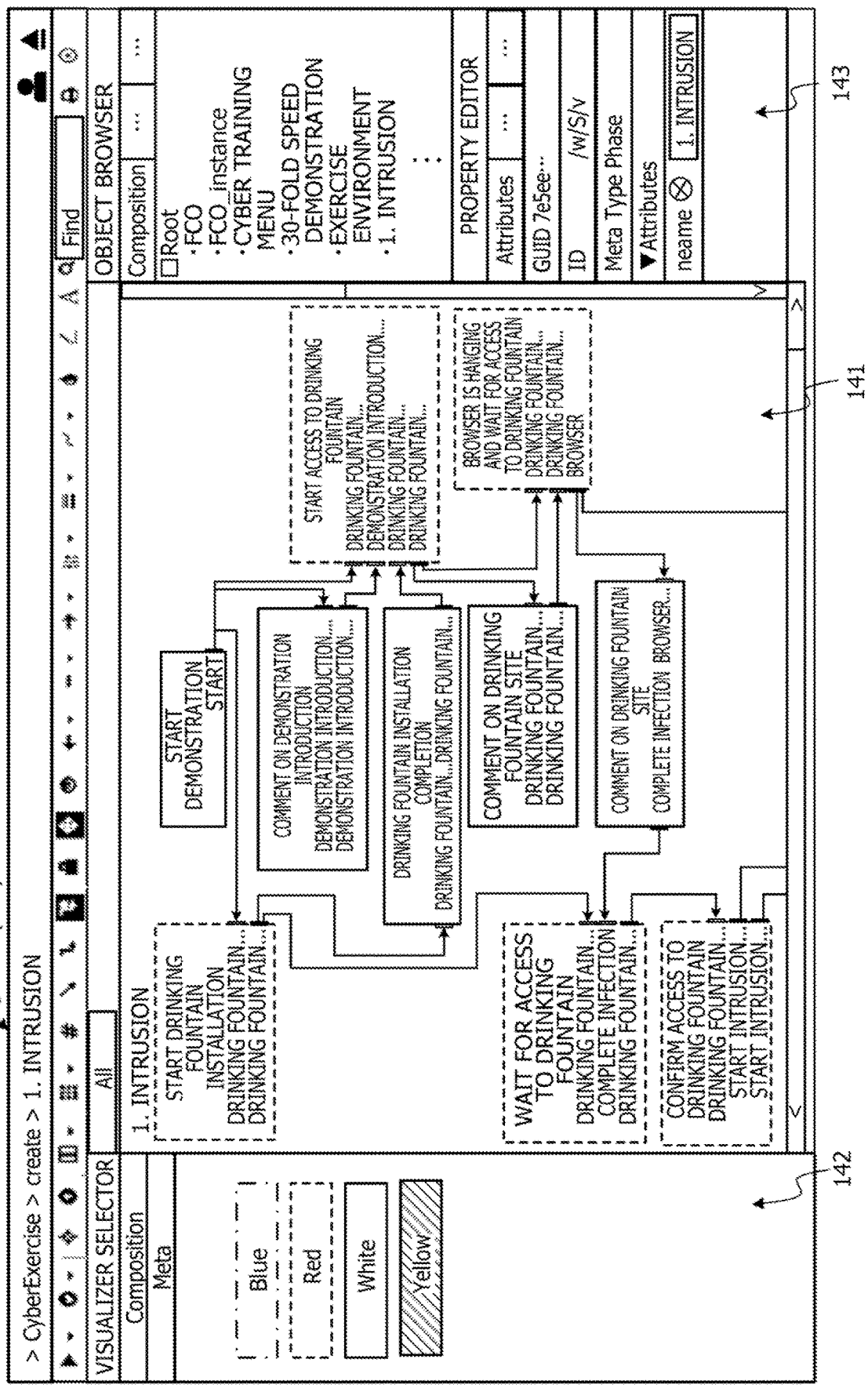
FIG. 5 is a diagram illustrating an exercise modeling screen of the exercise builder as an example of the embodiment.

FIG. 5 is a diagram illustrating the exercise modeling screen 140 of the exercise builder 2 as an example of the embodiment and illustrates an exercise modeling screen 140b for scene design.

Hereinafter, the exercise modeling screen for scene design of the exercise modeling screen 140 may be, for example, denoted with a reference numeral 140b. The scene is included in the phase, and the phase and the scene have an inclusive relationship.

In the example illustrated in FIG. 5, a scene included in the "intrusion" phase (scene in phase) is illustrated in the exercise modeling screen 140b for scene design.

For example, the operator double-clicks, for example, and selects the component of the "intrusion" phase on the exercise modeling screen 140a illustrated in FIG. 4 so that the exercise modeling screen 140b used to edit the "intrusion" phase illustrated in FIG. 5 is displayed.

In FIG. 5, for example, as the scenes in the phase on the attack side, "start drinking fountain installation", "wait for access to drinking fountain", and "confirm access to drinking fountain" are illustrated. Furthermore, in FIG. 5, as the scenes in the phase on the defense side, "start access to drinking fountain", and "browser is hanging and wait for access to drinking fountain" are illustrated. Moreover, in FIG. 5, as scenes in a phase of an interpreter, "start demonstration", "comment on demonstration introduction", "drinking fountain installation completion", "comment on drinking fountain site", and "drinking fountain access completion" are illustrated.

The operator designs the scene by selecting the components indicating these scenes from the component display region 142 and arranging the selected components in the work region 141 on the exercise modeling screen 140b. A scene name (component name) displayed for each component in the work region 141 may be set by the operator by using the mouse 15b, the keyboard 15a, or the like or may be set by the exercise builder 2.

In the exercise modeling screen 140b, the operator designs a scene including both of a component indicating a scene by a first information processing apparatus on the attack side and a component indicating a scene by a second information processing apparatus on the defense side in the cyber exercise. As a result, the cyber exercise scenario (program group) generated by the exercise builder 2 includes both of a first program executed by the first information processing terminal on the attack side and a second program executed by the second information processing terminal on the defense side in the cyber exercise.

Furthermore, in the example illustrated in FIG. 5, as in FIG. 4, the components of the scenes arranged in the work region 141 are connected by the connection lines. The connection line indicates continuity (relationship) between the scenes. For example, after the single scene is terminated, a scene connected to the scene by the connection line is executed. The connection line may be set by the operator by using the mouse 15b, the keyboard 15a, or the like or may be set by the exercise builder 2.

The scene in the phase set in the work region 141 is used as a connection port of the component of the phase including (containing) the scene. For example, the scene name of the scene included in the phase is set to a port name (connection port name) of the connection port of the phase.

The exercise editor 201 receives information regarding the component of each scene (scene name or the like) arranged in the work region 141 by the operator and the information regarding the connection line and stores the received information in the predetermined storage region such as the memory 12 or the storage device 13. The exercise editor 201 corresponds to a reception processing unit that receives information regarding a plurality of program components and information indicating a relationship between the plurality of program components.

Figure 6:
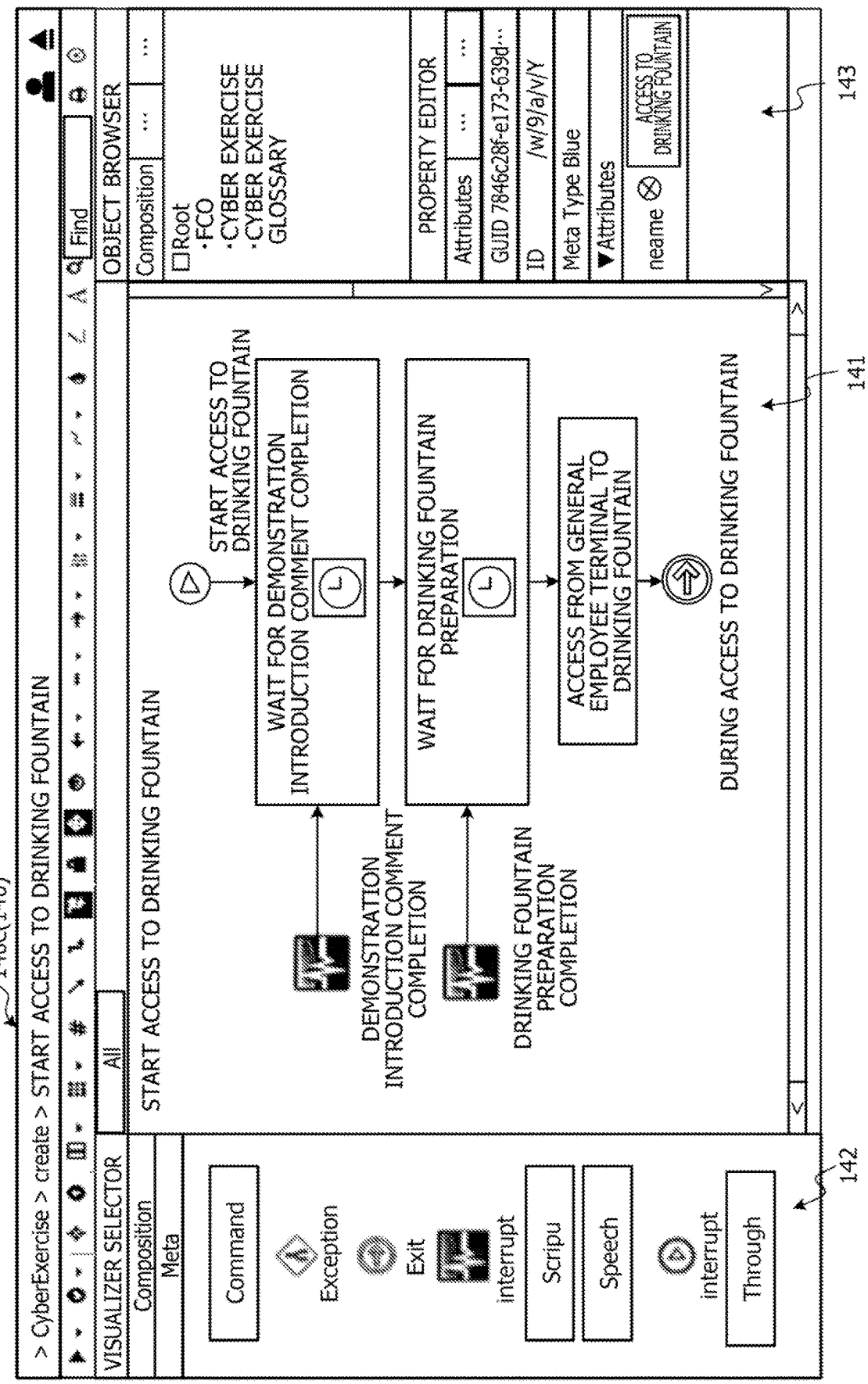
FIG. 6 is a diagram illustrating an exercise modeling screen of the exercise builder as an example of the embodiment.

FIG. 6 is a diagram illustrating the exercise modeling screen 140 of the exercise builder 2 as an example of the embodiment and illustrates an exercise modeling screen 140c used for action design. Hereinafter, the exercise modeling screen for action design of the exercise modeling screen 140 may be, for example, denoted with a reference 140c.

The action design includes design of an event or the like included in the scene, in addition to design of an action included in the scene. For example, design of various processing included in the scene is referred to as the action design.

The actions and the events are included in the scene, and the action and the event and the scene have an inclusive relationship.

Note that, in a case where the exercise modeling screens 140a, 140b, and 140c are not, for example, distinguished from each other, the exercise modeling screens 140a, 140b, and 140c are indicated as the exercise modeling screen 140.

In the example illustrated in FIG. 6, in the exercise modeling screen 140c for action design, an action included in the "start access to drinking fountain" scene (action in scene) is illustrated.

For example, the operator double-clicks, for example, and selects the component of "start access to drinking fountain" on the exercise modeling screen 140b illustrated in FIG. 5 so that the exercise modeling screen 140c used to edit the action included in the "start access to drinking fountain" scene illustrated in FIG. 6 is displayed.

The action includes command execution and a GUI operation by the exercising person, an instruction and status explanation by voice reproduction, or the like. The event is generated, for example, in a case where the event occurrence condition is satisfied or in a case where an expected action is performed.

For example, at the time of the design of the cyber exercise, the operator sets the plurality of phases (phase design) included in the cyber exercise, and then, sets the scenes (scene setting) included in each phase regarding each of these phases. Furthermore, the operator sets the action or the event included in each scene (event setting or action setting).

In FIG. 6, for example, as an action in the "start access to drinking fountain" scene, "wait for demonstration introduction comment completion" and "wait for drinking fountain preparation" are illustrated. Furthermore, in FIG. 6, a "demonstration introduction comment completion" event and a "start access to drinking fountain" event that are inputs with respect to the "wait for demonstration introduction comment completion" and a "drinking fountain preparation completion" event that is an input with respect to the "wait for drinking fountain preparation" in the "start access to drinking fountain" scene are also illustrated.

The operator designs the action by selecting the components indicating these actions and events from the component display region 142 and arranging the selected components in the work region 141 on the exercise modeling screen 140c.

An action name or an event name displayed for each component in the work region 141 may be set by the operator by using the mouse 15b, the keyboard 15a, or the like or may be set by the exercise builder 2. Hereinafter, there is a case where a name set to each component such as an action name, an event name, a scene name, or a phase name is collectively referred to as a component name.

Furthermore, in the example illustrated in FIG. 6, as in FIG. 4, the components of the actions arranged in the work region 141 are connected by the connection lines. The connection line may be set by the operator by using the mouse 15b, the keyboard 15a, or the like or may be set by the exercise builder 2.

The operator may define, for example, a condition (activation condition) for activating a scene, and activates the scene in a case where this activation condition is satisfied.

The operator may define an operation (action), command execution processing, or the like performed by the exercising person in the cyber exercise as an action.

The action or the event set in the work region 141 is represented as a connection port of the component of the scene in the exercise modeling screen 140b representing the scene including the action (upper than action). For example, the action name of the action or the event name of the event included in the scene is set as the port name of the connection port of the scene.

The exercise editor 201 stores the information (component name or the like) of the component of each action or event arranged in the work region 141 and the information regarding the connection line in the predetermined storage region such as the memory 12 or the storage device 13.

Furthermore, the exercise builder 2 includes a function for setting (defining) a computer environment (cyber range) to be a cyber exercise area. There is a case where a computer environment to be a stage of the cyber exercise is referred to as an exercise environment.

Figure 7:
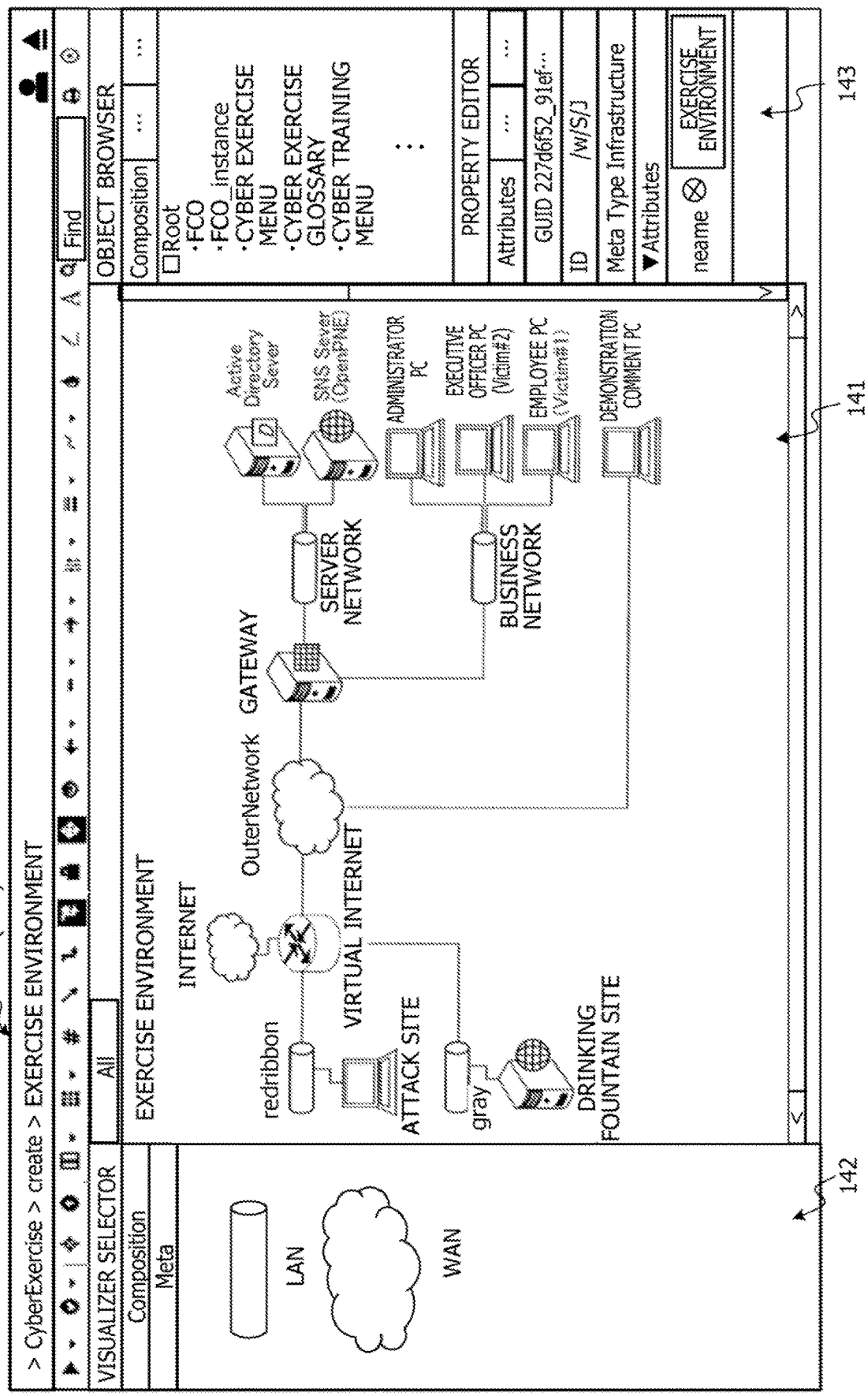
FIG. 7 is a diagram illustrating an exercise modeling screen of the exercise builder as an example of the embodiment.

FIG. 7 is a diagram illustrating an exercise modeling screen 140d of the exercise builder 2 as an example of the embodiment and illustrates the exercise modeling screen 140d for exercise environment design.

On the exercise modeling screen 140d for exercise environment design, a computer element included in the exercise environment is displayed in the component display region 142 as a component.

For example, a component of the computer element such as a personal computer, a network device, or the like may be expressed by an icon having a shape simulating an appearance of each of these devices. The operator designs the exercise environment by arranging the component of the computer element displayed in the component display region 142 in the work region 141 by dragging and dropping the component.

The computer element is, for example, a Wide Area Network (WAN), a Local Area Network (LAN), a gateway, a network, a server computer, a Personal Computer (PC), or the like.

In the example illustrated in FIG. 7, an exercise environment configured by connecting the server computer, the PC, or the like via the WAN or the LAN is illustrated.

A connection line in the work region 141 indicates a network connection relationship between the devices.

The device arranged in the work region 141 is used as a connection port in the exercise environment including the device. A name set to the device is used as a connection port name of the device.

The exercise editor 201 stores information regarding each component included in the exercise environment arranged in the work region 141 and the information regarding the connection line in the predetermined storage region such as the memory 12 or the storage device 13 as a cyber exercise scenario model.

The exercise editor 201 may set unique identification information (component identification (ID)) to the component installed (dragged) in the work region 141.

The scenario definition file creation unit 202 creates a scenario definition file, in which a scenario of a cyber exercise (cyber exercise scenario) is written, on the basis of design information of the cyber exercise (cyber exercise scenario model) input by the function of the exercise editor 201 by the operator. The cyber exercise scenario is a program group that controls execution of the cyber exercise and is configured by combining the plurality of components (program component).

The scenario definition file creation unit 202 creates the scenario definition file based on the information regarding each component and connection line set in the work region 141 by the operator. For example, the scenario definition file creation unit 202 functions as a generation unit that generates the program group included in the scenario that controls the execution of the cyber exercise by combining the plurality of program components on the basis of the connection line that is the information indicating the relationship.

The scenario definition file creation unit 202 extracts the component name (phase name, scene name, and action name) of each component included in the cyber exercise scenario model and the connection port name included in each component. Furthermore, the scenario definition file creation unit 202 acquires information regarding a component of a connection source of the connection line connected to each component from the cyber exercise scenario model. Hereinafter, there is a case where the component name is referred to as an event name.

The scenario definition file creation unit 202 acquires, for example, information regarding a component (connection source component) connected to each component included in the cyber exercise scenario model by the connection line.

Furthermore, in a case where the component name (event name) is not set to the connection source component, the scenario definition file creation unit 202 has a function for automatically generating an event name corresponding to the component.

The scenario definition file creation unit 202 uses the component name (event name) of the other component connected to the component via the connection line or the generated event name as a trigger name used to execute another scenario definition file (second scenario definition file) in one scenario definition file (first scenario definition file).

Figure 8:
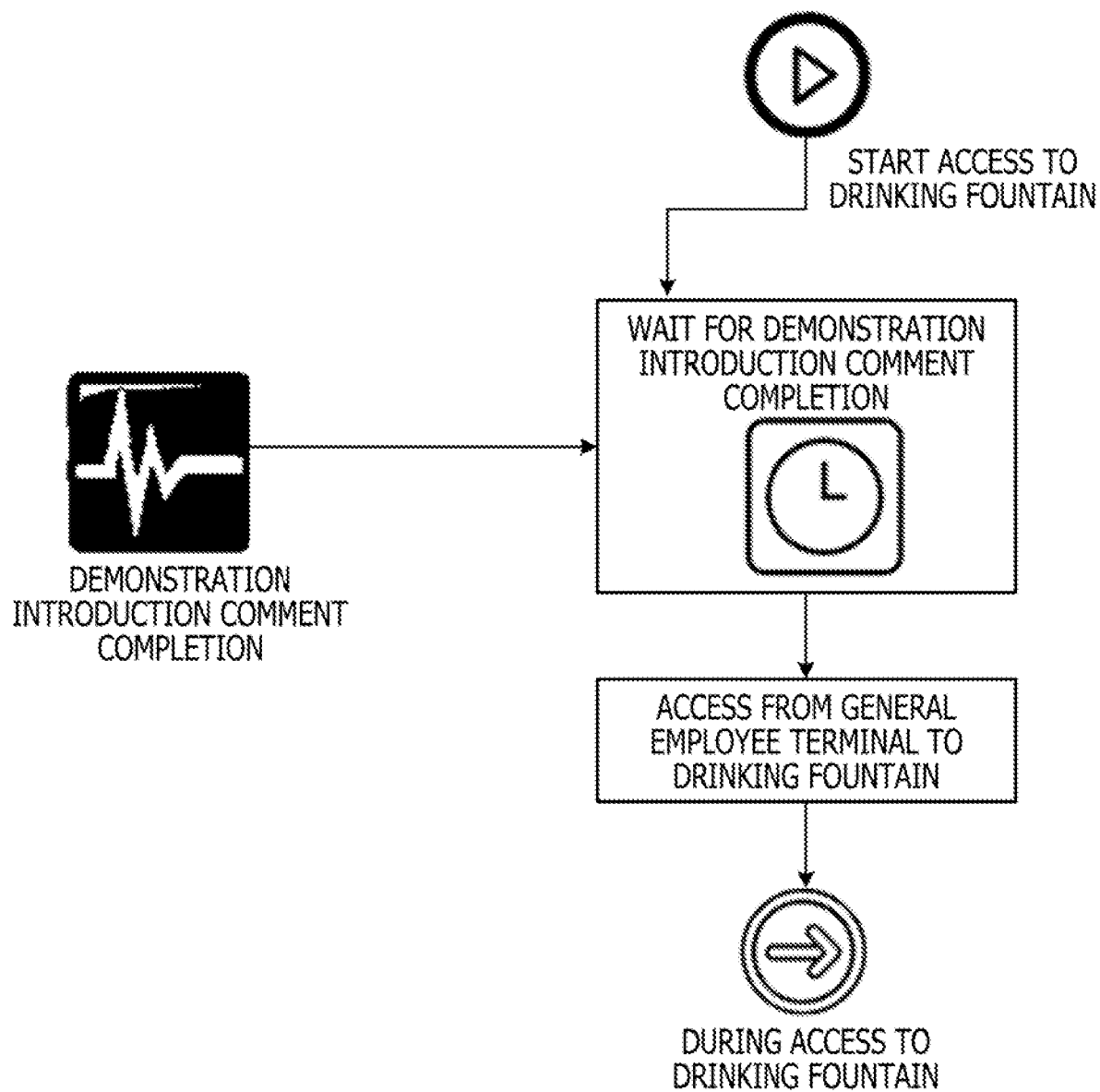
FIG. 8 is a diagram for explaining a method of creating a scenario definition file in the exercise builder as an example of the embodiment.

FIGS. 8 and 9 are diagrams for explaining a method of creating the scenario definition file in the exercise builder 2 as an example of the embodiment. FIG. 8 is a diagram illustrating a cyber exercise scenario model of an action in a scene, and FIG. 9 is a diagram illustrating scenario data corresponding to the cyber exercise scenario model illustrated in FIG. 8.

The plurality of pieces of scenario data is stored in the scenario definition file. The cyber exercise scenario model illustrated in FIG. 8 illustrates the "start access to drinking fountain" scene on the defense side.

The cyber exercise scenario model illustrated in FIG. 8 includes two components including "wait for demonstration introduction comment completion" and "start access from general employee terminal to drinking fountain site".

The cyber exercise scenario model illustrated in FIG. 8 includes triggers of both of the event "start access to drinking fountain" and "demonstration introduction comment completion". When these events are executed, an action of "wait for demonstration introduction comment completion" is executed, and then, a "start access from general employee terminal to drinking fountain site" action is executed. Furthermore, a "during access to drinking fountain" event is executed subsequent to the "start access from general employee terminal to drinking fountain site" action.

Hereinafter, an example will be described in which the scenario definition file creation unit 202 creates a cyber exercise scenario model regarding the "wait for demonstration introduction comment completion" action.

The scenario definition file creation unit 202 acquires information regarding a connection source of the "wait for demonstration introduction comment completion" action, regarding the "wait for demonstration introduction comment completion" action. The upstream side of the "wait for demonstration introduction comment completion" action is connected to the "start access to drinking fountain" event and the "demonstration introduction comment completion" event.

The scenario definition file creation unit 202 creates scenario data for each action or event in the cyber exercise scenario model and creates a scenario definition file that is a collection of the plurality of pieces of scenario data.

The scenario definition file creation unit 202 creates a scenario definition file of each of the "wait for demonstration introduction comment completion" action, the "start access to drinking fountain" event, and the "demonstration introduction comment completion" event. In FIG. 9, the scenario data of the "start access to drinking fountain" event is represented by a reference numeral A, the scenario data of the "demonstration introduction comment completion" event is represented by a reference numeral B, and the scenario data of the "wait for demonstration introduction comment completion" action is represented by a reference numeral C, respectively.

The scenario definition file creation unit 202 acquires information regarding a component (connection source component) connected to the component included in the cyber exercise scenario model by the connection line. For example, the scenario definition file creation unit 202 acquires information regarding a component (connection source component) connected to the "wait for demonstration introduction comment completion" action via the connection line.

For example, the scenario definition file creation unit 202 acquires a component name of the component of the connection source (upstream side of processing in relationship) on the basis of the connection line (information indicating relationship).

In the example illustrated in FIG. 9, the upstream side of the "wait for demonstration introduction comment completion" action is connected to the "start access to drinking fountain" event and the "demonstration introduction comment completion" event.

In a case where an event name is not set to these connection source events, the scenario definition file creation unit 202 automatically generates an event name corresponding to the component. For example, the scenario definition file creation unit 202 may generate a random character string and use the character string as an event name. Furthermore, the scenario definition file creation unit 202 may express a position (arrangement) of each event in the cyber exercise scenario model by using a numerical value or the like and use this numerical value or the like as the event name, and various modifications can be implemented.

In a case where the component name is not set to a component on the upstream side, the scenario definition file creation unit 202 functions as a component name setting unit that sets the component name to the component on the upstream side.

In this example, the scenario definition file creation unit 202 sets an event name "Blue:01:01:03" to the "wait for demonstration introduction comment completion" action, sets "Blue:01:01:02" to the "demonstration introduction comment completion" event, and sets "Blue:01:01:04" to the "start access from general employee terminal to drinking fountain site" action, respectively. Note that it is assumed that an event name "Start" be set to the "start access to drinking fountain" event.

Furthermore, the "during access to drinking fountain" event is connected to the downstream side of "wait for demonstration introduction comment completion." It is assumed that the event name "Blue:01:01:04" be set to the "during access to drinking fountain" event. The scenario definition file creation unit 202 may set an event name of the (connection destination) event connected to the downstream side of the component to be processed via the connection line.

In the cyber exercise scenario model illustrated in FIG. 8, the "start access to drinking fountain" event is triggered by an input of the event name "Start" of the event, and the "wait for demonstration introduction comment completion" action is executed subsequent to the event.

The scenario definition file creation unit 202 creates the scenario data indicated by the reference numeral A in FIG. 9 on the basis of such a cyber exercise scenario model. For example, the scenario definition file creation unit 202 sets "Start" to "trigger" based on being triggered by the input of "Start". Furthermore, an event name "Blue:01:01:03" is set to "nextEvent" ("eventName":"Blue:01:01:03") on the basis of that the "wait for demonstration introduction comment completion" action is executed subsequent to the "during access to drinking fountain" event.

Furthermore, in the cyber exercise scenario model illustrated in FIG. 8, the "demonstration introduction comment completion" event is started by specifying the event name "Blue:01:01:02" of the event, and the "wait for demonstration introduction comment completion" action is executed subsequent to the event.

The scenario definition file creation unit 202 creates the scenario data indicated by the reference numeral B in FIG. 9 on the basis of such a cyber exercise scenario model and stores the created data in the scenario definition file. For example, the scenario definition file creation unit 202 sets "Blue:01:01:02" to "trigger" based on being triggered by an input of "Blue:01:01:02". Furthermore, an event name "Blue:01:01:03" is set to "nextEvent" ("eventName":"Blue:01:01:03") on the basis of that the "wait for demonstration introduction comment completion" action is executed subsequent to the "demonstration introduction comment completion" event.

Furthermore, in the cyber exercise scenario model illustrated in FIG. 8, the "wait for demonstration introduction comment completion" event is started under conditions such that the event name "Blue:01:01:03" of the event is specified and both of the "start access to drinking fountain" event and the "demonstration introduction comment completion" event are completed. Furthermore, the "start access from general employee terminal to drinking fountain site" action is executed subsequent to the "wait for demonstration introduction comment completion" event.

The scenario definition file creation unit 202 creates the scenario data indicated by the reference numeral C in FIG. 9 on the basis of such a cyber exercise scenario model and stores the created data in the scenario definition file. For example, the scenario definition file creation unit 202 sets "Blue:01:01:03" to "trigger" based on being triggered by an input of "Blue:01:01:03".

The scenario definition file creation unit 202 sets a component name of a component (first program component) on the upstream side acquired on the basis of the connection line as a trigger that activates an event corresponding to a component (second program component) of the connection destination (downstream side of processing in relationship of components) of the component.

The scenario definition file creation unit 202 acquires the component name of the component (first program component) on the upstream side, which needs to be executed first, from among the plurality of components on the basis of the connection line. Then, the scenario definition file creation unit 202 sets the component name of the component on the upstream side as a trigger that activates the event corresponding to the component (second program component) of the connection destination subsequent to the component (downstream side of processing in relationship of components).

Furthermore, ""Event.Start":true" and ""Event. Blue:01: 01:02":true" are set to "triggerConditions" on the basis of the start under the condition such that both of the "start access to drinking fountain" event and the "demonstration introduction comment completion" event are completed. Furthermore, an event name "Blue:01:01:04" is set to "nextEvent" ("eventName":"Blue:01:01:04") on the basis of that the "start access from general employee terminal to drinking fountain site" action is executed subsequent to the "wait for demonstration introduction comment completion" event.

By executing the scenario definition file created in this way by the information processing apparatus, an event corresponding to the component of the connection destination can be generated after an event corresponding to the component of the connection source connected by the connection line. On the basis of the information (connection line) indicating the relationship between the components, the scenario definition file creation unit 202 corresponds to an execution control unit that controls generation of the event (event) corresponding to execution between the components having the relationship according to the information.

(B) Operation

An input operation example by the operator to create the cyber exercise scenario model in the exercise builder 2 as an example of the embodiment configured as described above will be described with reference to FIGS. 10 to 29.

Figure 10:
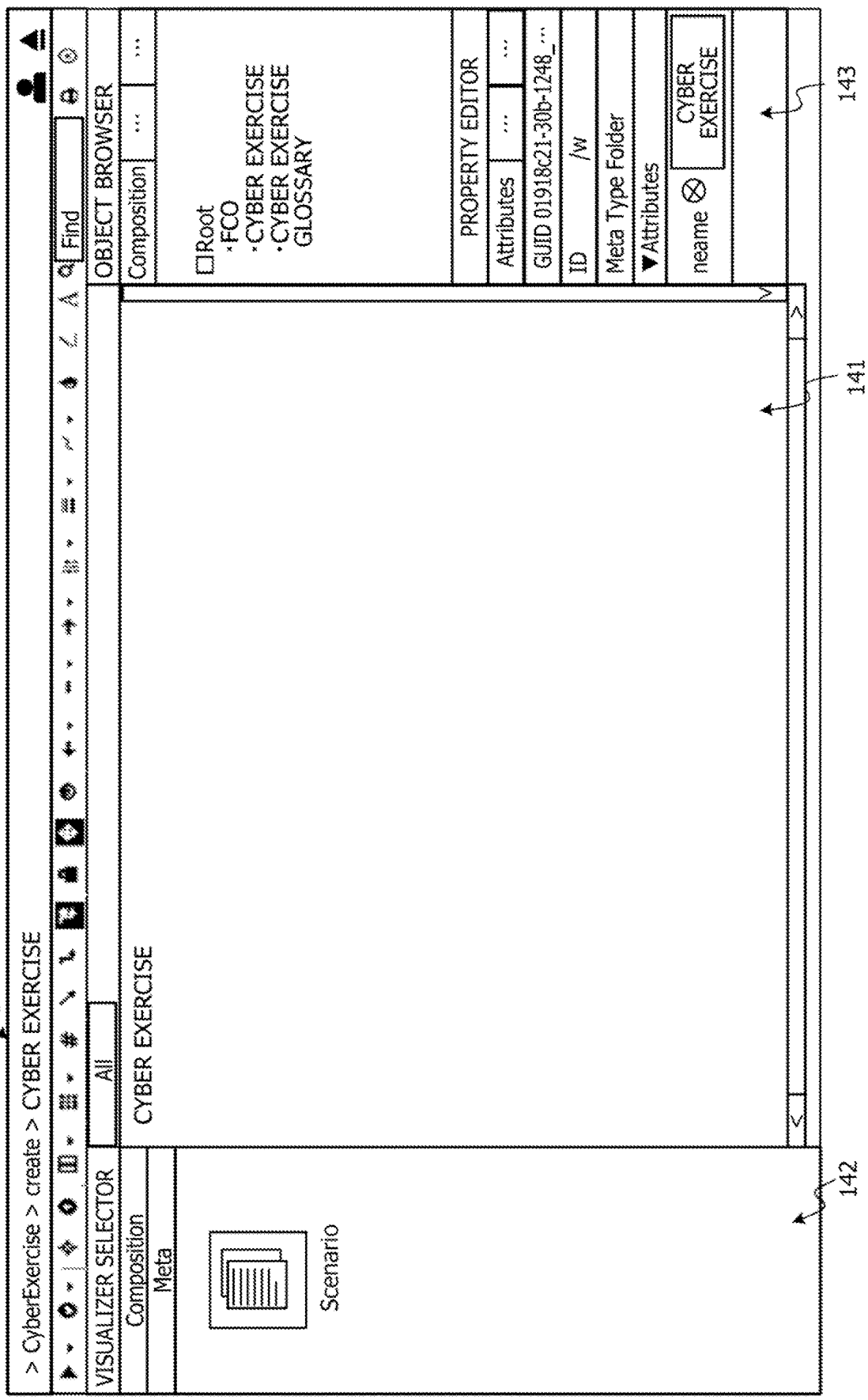
FIG. 10 is a diagram illustrating a transition of the exercise modeling screen of the exercise builder as an example of the embodiment.
Figure 11:
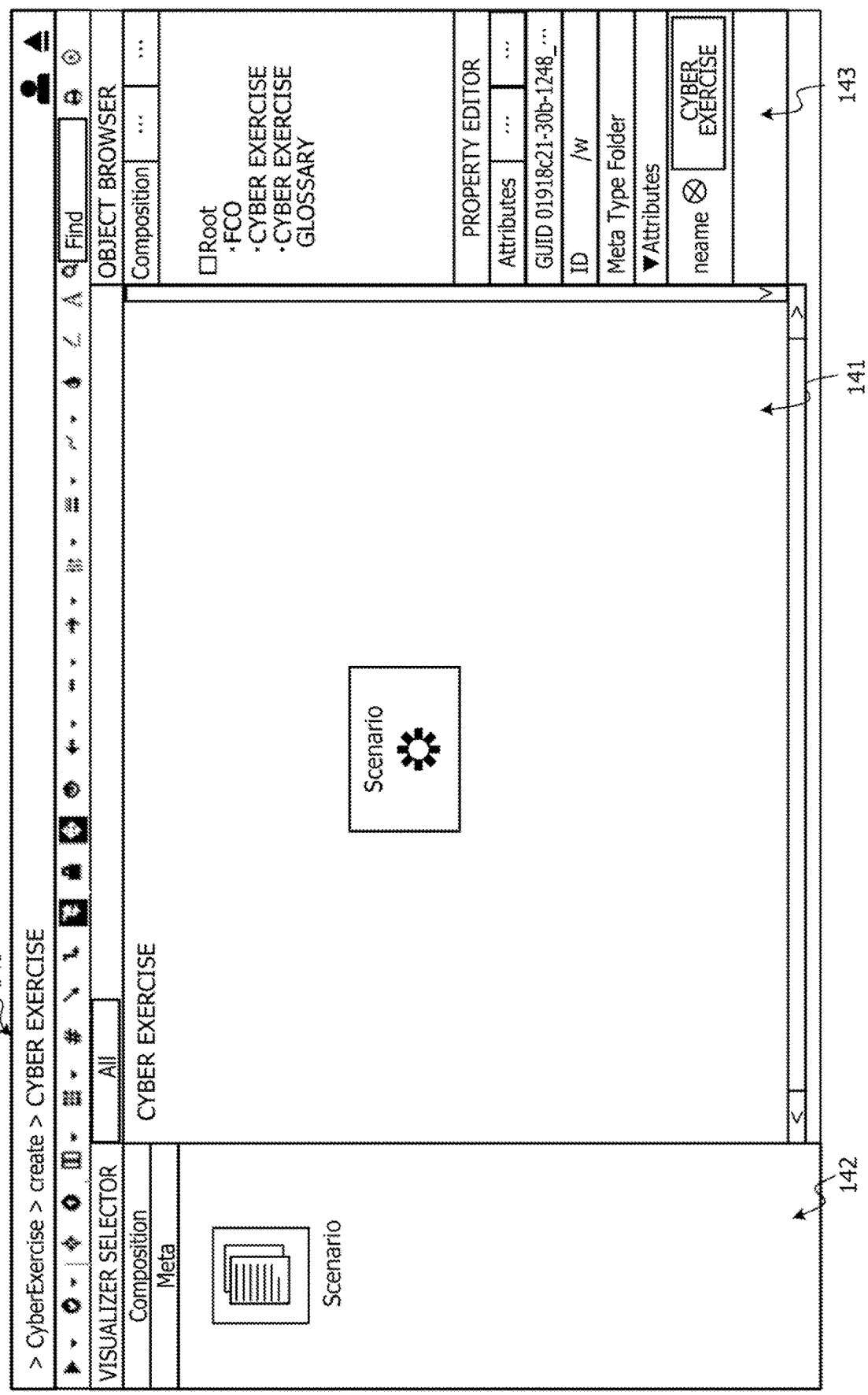
FIG. 11 is a diagram illustrating a transition of the exercise modeling screen of the exercise builder as an example of the embodiment.
Figure 12:
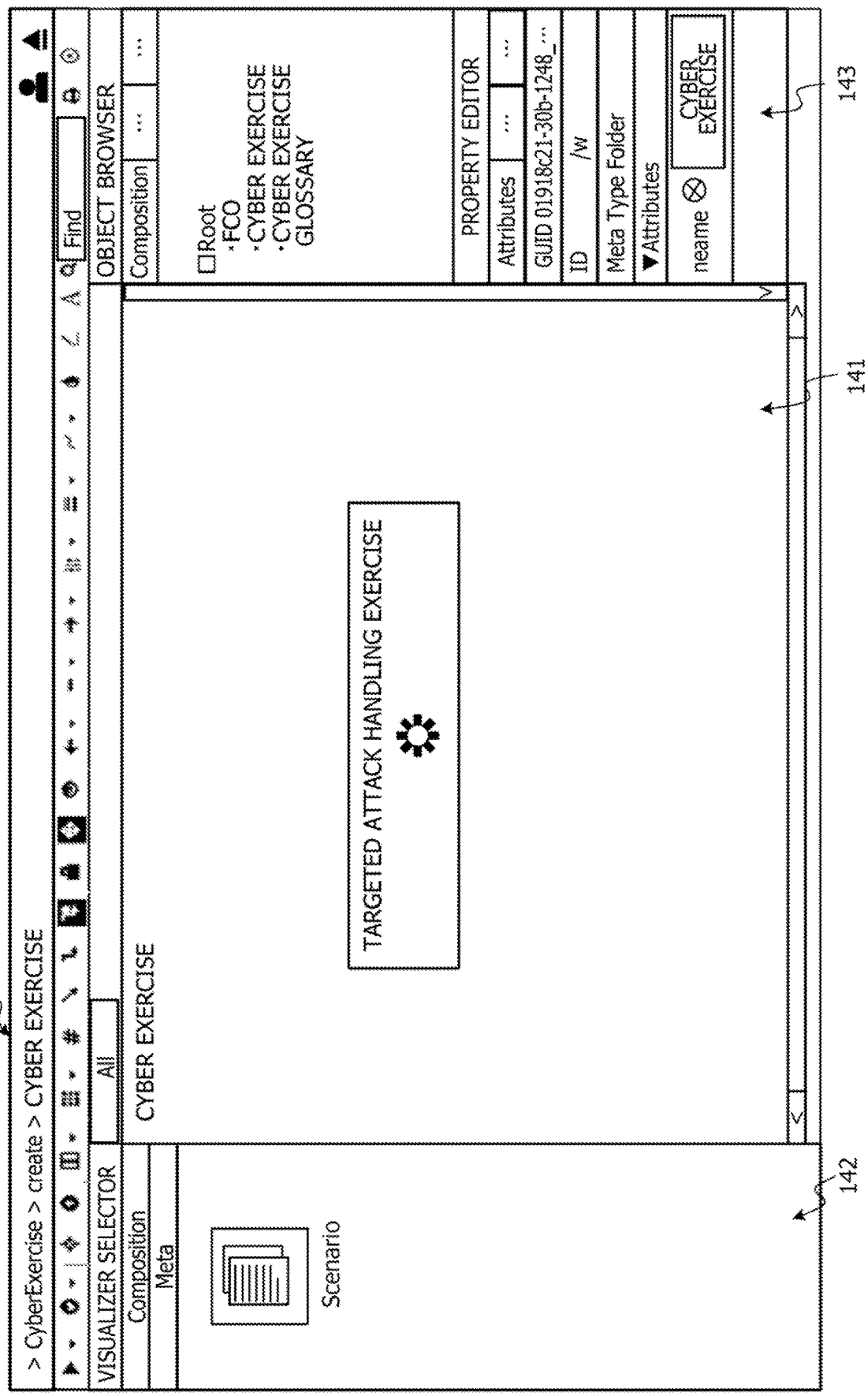
FIG. 12 is a diagram illustrating a transition of the exercise modeling screen of the exercise builder as an example of the embodiment.

FIGS. 10 to 12 are diagrams illustrating transitions of the exercise modeling screen 140 and illustrate a process of defining a cyber exercise.

On the exercise modeling screen 140 illustrated in FIG. 10, the operator selects a component indicating a scenario displayed in the component display region 142 and drags the selected component to the work region 141. As a result, the component is arranged in the work region 141 (refer to FIG. 11). In the example illustrated in FIG. 11, a name "Scenario" that has been set to the component in advance is set to the component dragged in the work region 141.

The operator may change the name of the component arranged in the work region 141 as needed (refer to FIG. 12). In FIG. 12, an example is illustrated in which a name of "targeted attack handling exercise" is set to the component.

The operator selects by, for example, double-clicking the component of the "targeted attack handling exercise" in the work region 141 by using the mouse 15b or the like so as to start to input a cyber exercise scenario model regarding the "targeted attack handling exercise".

Figure 13:
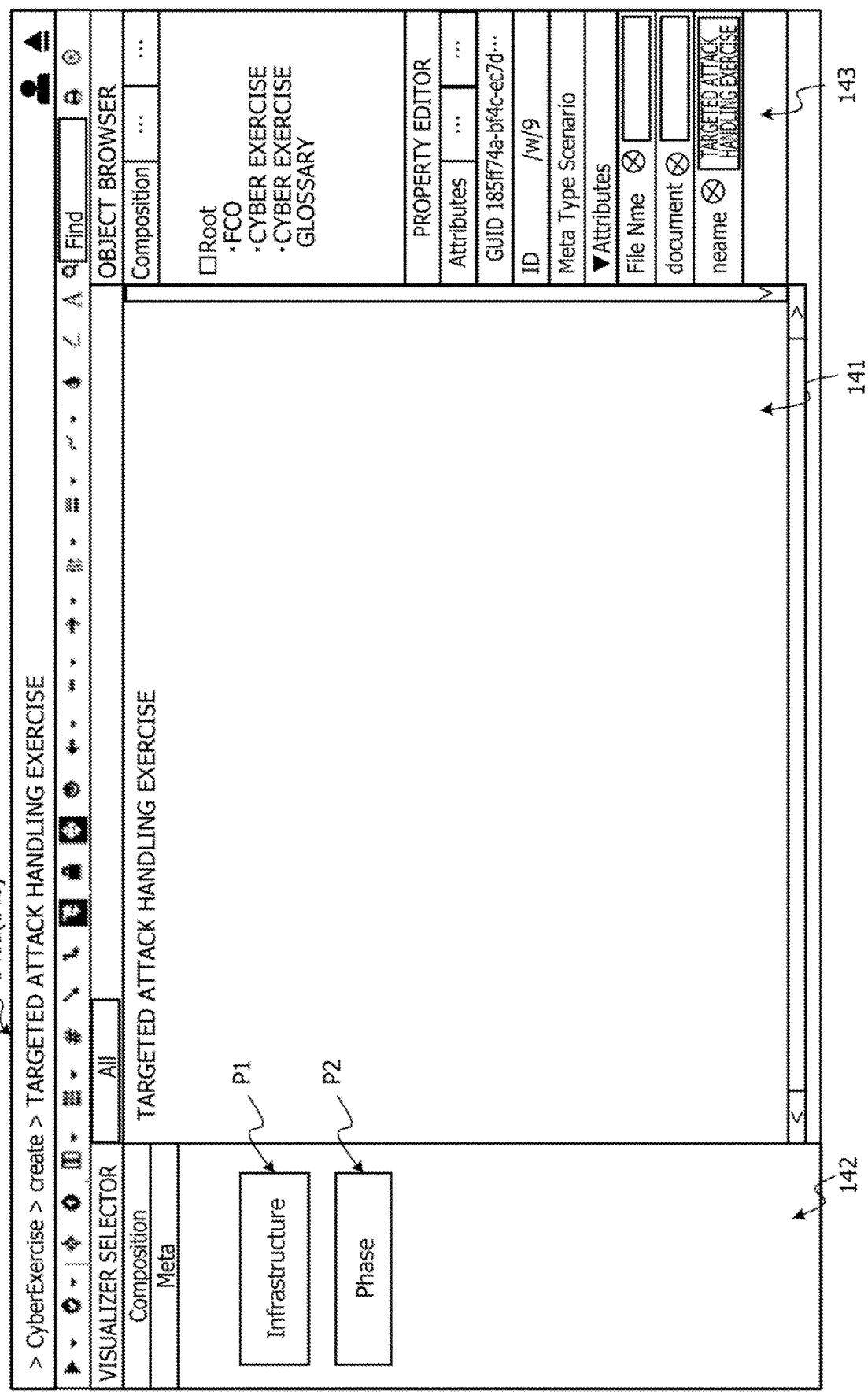
FIG. 13 is a diagram illustrating a transition of the exercise modeling screen of the exercise builder as an example of the embodiment.
Figure 14:
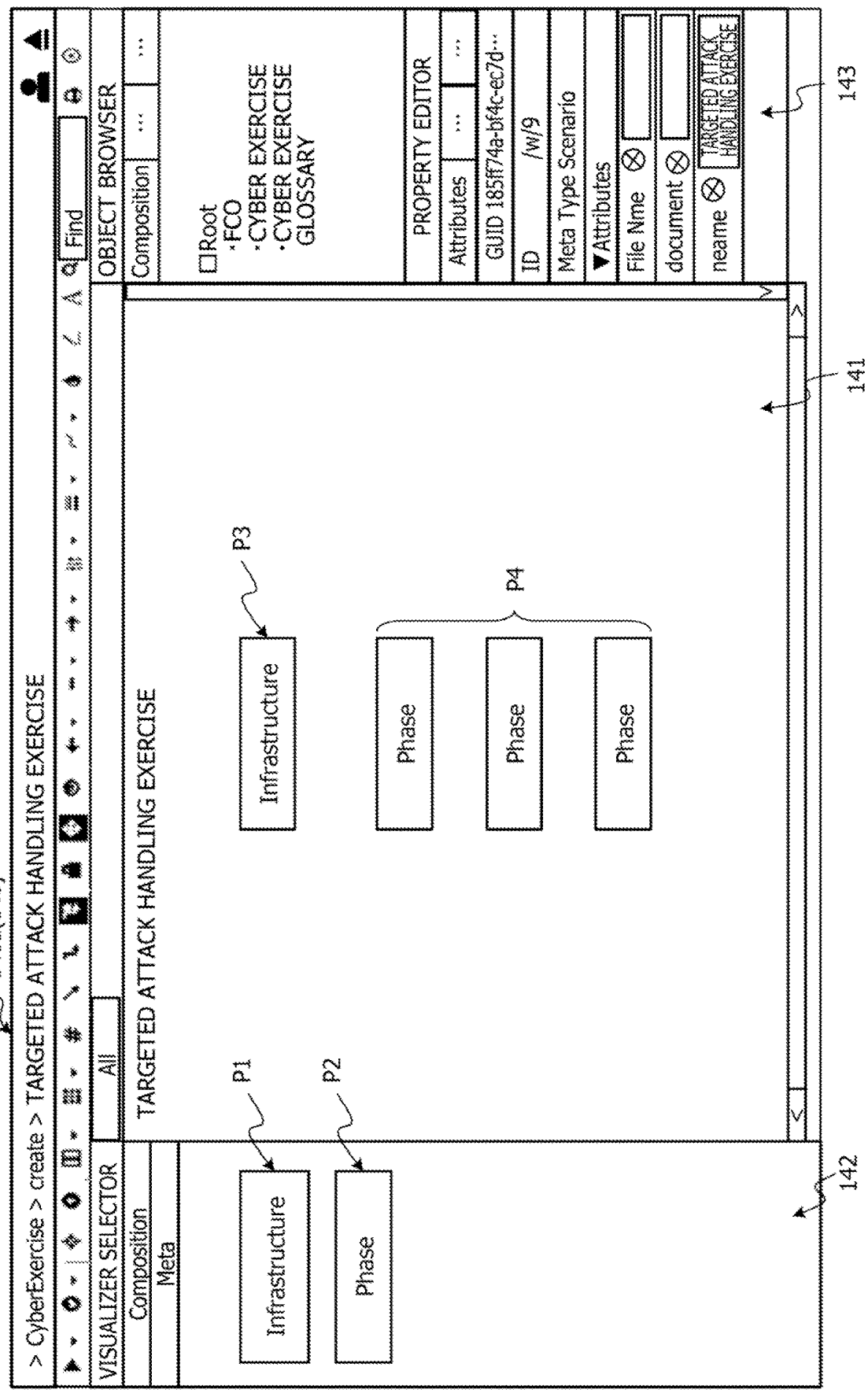
FIG. 14 is a diagram illustrating a transition of the exercise modeling screen of the exercise builder as an example of the embodiment.
Figure 15:
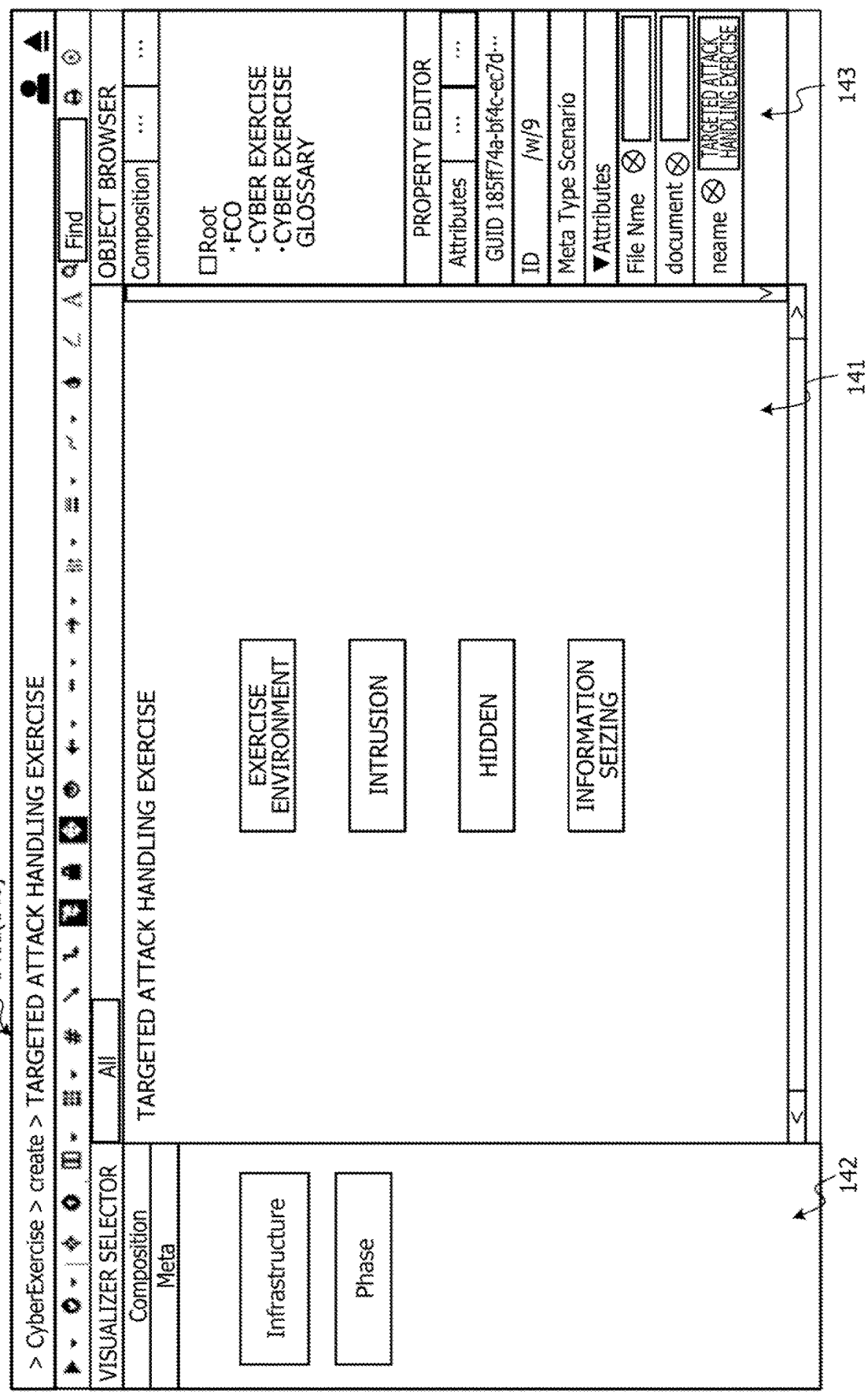
FIG. 15 is a diagram illustrating a transition of the exercise modeling screen of the exercise builder as an example of the embodiment.

FIGS. 13 to 15 are diagrams illustrating transitions of the exercise modeling screen 140a (140) and illustrate a process of defining an exercise environment and phases regarding the targeted attack handling exercise.

On the exercise modeling screen 140a illustrated in FIG. 13, the operator selects a component (refer to reference numeral P1) indicating the exercise environment from the component display region 142 and drags the selected component to the work region 141. Furthermore, on the exercise modeling screen 140, the operator selects a component (refer to reference numeral P2) indicating a phase from the component display region 142 and drags the selected component to the work region 141.

As a result of performing these operations, in the exercise modeling screen 140a illustrated in FIG. 14, a component (refer to reference numeral P3) indicating a single exercise environment and components (refer to P4) indicating three phases are arranged.

In the example illustrated in FIG. 14, a name "Infrastructure" that has been set to the component in advance is set to the component that has been dragged to the work region 141 and indicates the exercise environment, and a name "Phase" that has been set in advance is set to each component indicating the phase.

The operator may change the name of the component arranged in the work region 141 as needed (refer to FIG. 15). In FIG. 15, an example is illustrated in which a name "exercise environment" is set to the component indicating the exercise environment. Furthermore, "intrusion", "hidden", and "information seizing" are respectively set to the three components indicating the phases.

The operator selects an icon of the "exercise environment" in the work region 141 by, for example, double-clicking the icon by using the mouse 15b or the like so as to start to input the exercise environment.

Figure 16:
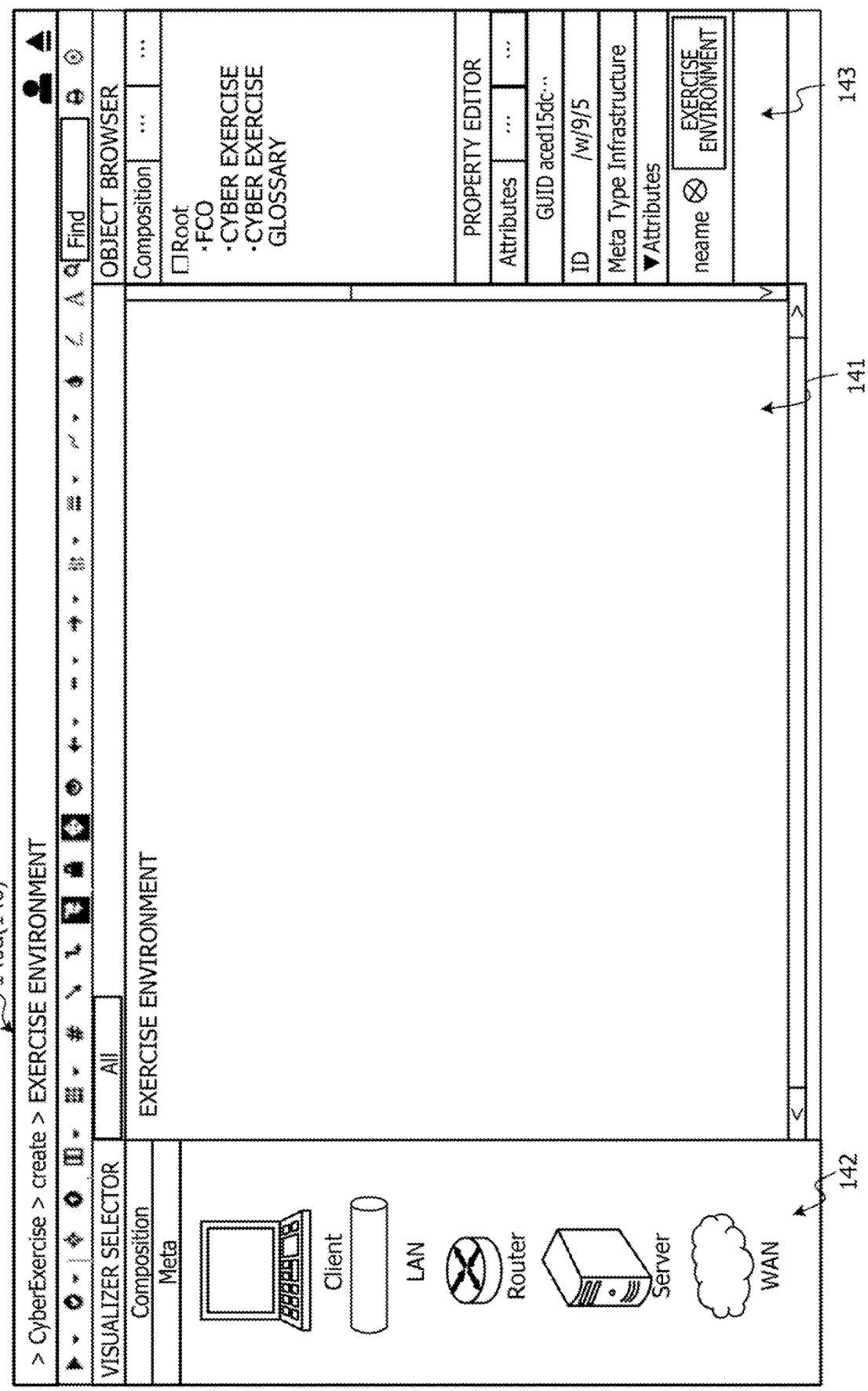
FIG. 16 is a diagram illustrating a transition of the exercise modeling screen of the exercise builder as an example of the embodiment.
Figure 17:
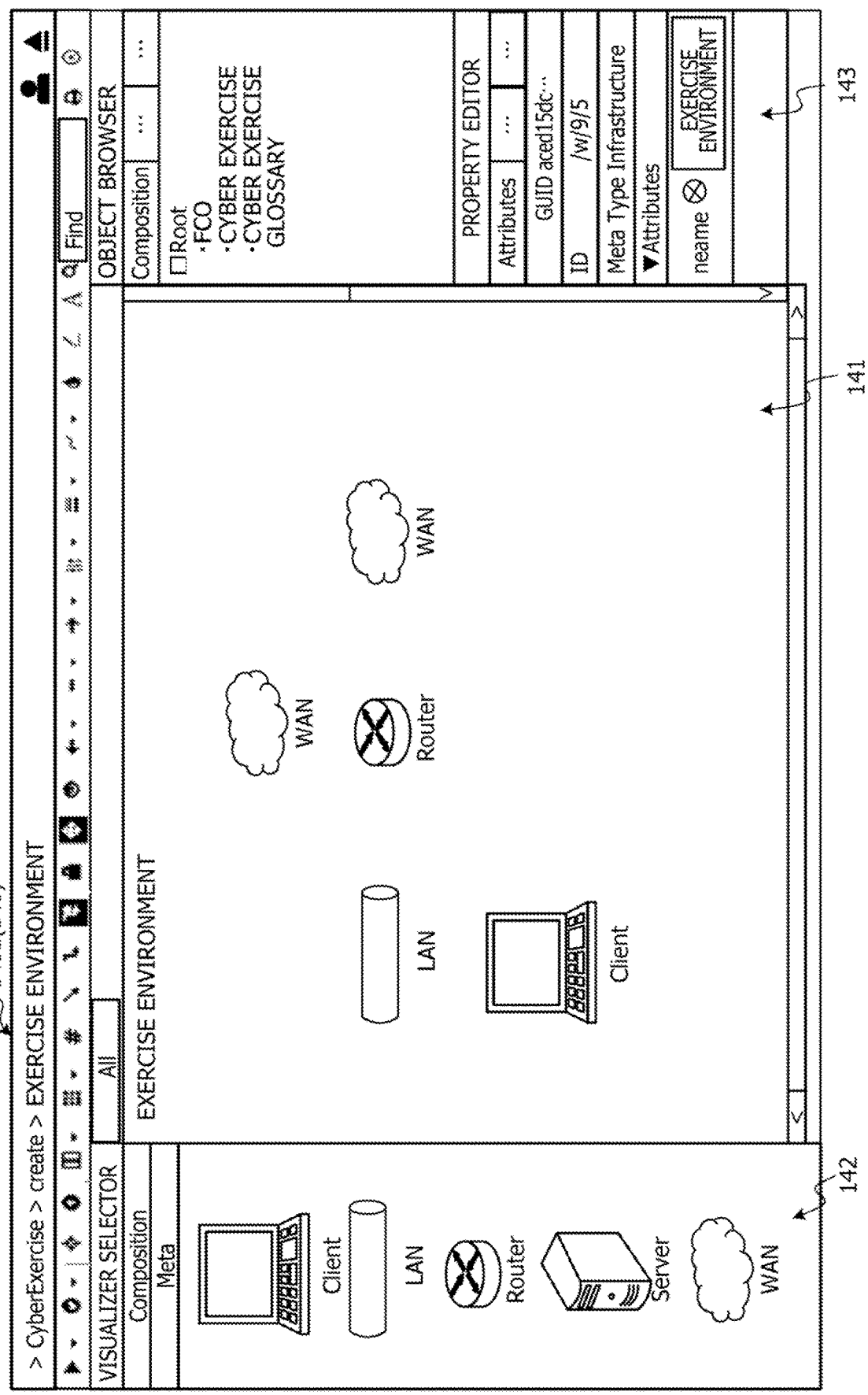
FIG. 17 is a diagram illustrating a transition of the exercise modeling screen of the exercise builder as an example of the embodiment.
Figure 18:
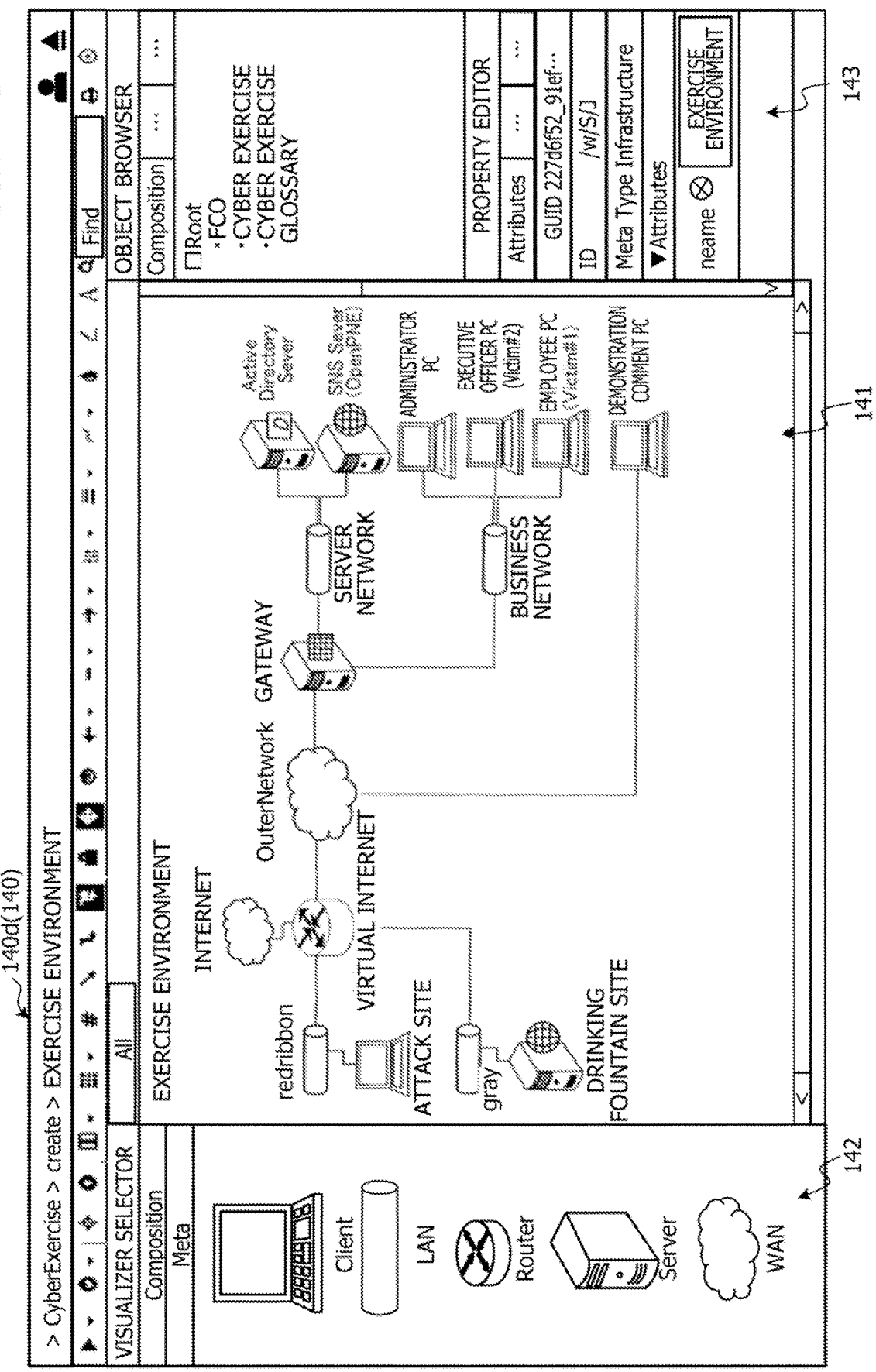
FIG. 18 is a diagram illustrating a transition of the exercise modeling screen of the exercise builder as an example of the embodiment.

FIGS. 16 to 18 are diagrams illustrating transitions of the exercise modeling screen 140d (140) and illustrate a process of defining a configuration of the exercise environment.

The operator selects an icon of the "exercise environment" in the work region 141 illustrated in FIG. 15 by, for example, double-dicking the icon by using the mouse 15b or the like so as to start to input the exercise environment.

On the exercise modeling screen 140d illustrated in FIG. 16, the operator selects a plurality of components indicating electronic devices or the like used to configure the exercise environment from the component display region 142 and drags each of the components to the work region 141.

As a result of performing these operations, in the exercise modeling screen 140d illustrated in FIG. 17, a router, a client computer (Client), a LAN, and two WANs are arranged.

In the example illustrated in FIG. 17, a name that has been set to the component in advance is set to the component indicating the exercise environment dragged to the work region 141.

The operator may change the name of the component arranged in the work region 141 as needed (refer to FIG. 18). In FIG. 18, an example is illustrated in which a name is set to each component indicating the exercise environment. Furthermore, in the example illustrated in FIG. 18, the components connected via the network are coupled via the connection line.

Figure 19:
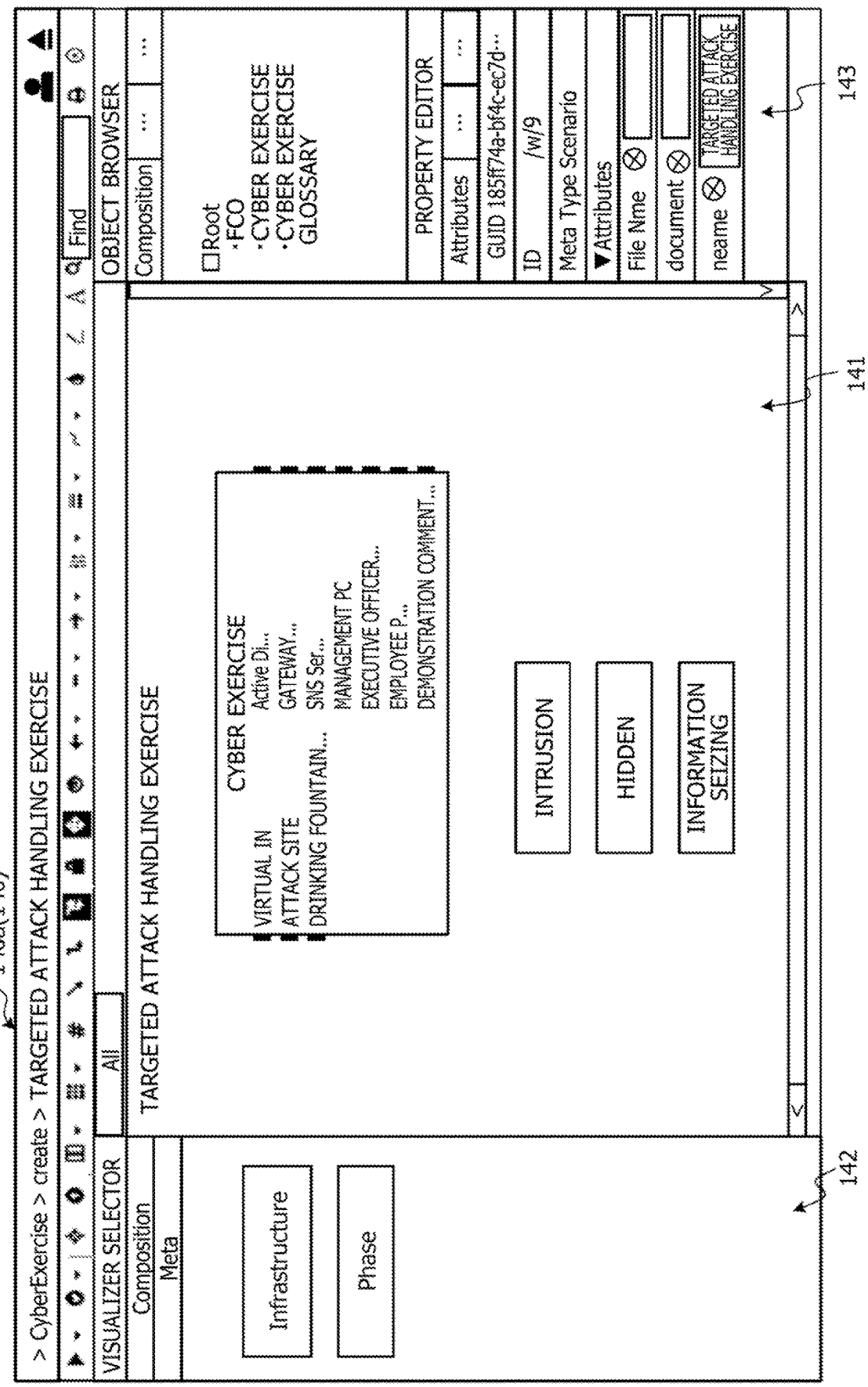
FIG. 19 is a diagram illustrating an exercise modeling screen showing an exercise environment and phases of a targeted attack handling exercise in the exercise builder as an example of the embodiment.

FIG. 19 illustrates the exercise modeling screen 140a (140) showing the exercise environment and the phases of the targeted attack handling exercise.

In the exercise modeling screen 140a illustrated in FIG. 19, a state where setting of the exercise environment has been completed is illustrated.

For example, each component included in the exercise environment illustrated in FIG. 18 is used as the connection port of the component in the exercise environment in the exercise modeling screen 140a illustrated in FIG. 19. For example, the component name of the electronic device or the like included in the exercise environment is set as a port name of the connection port of the component in the exercise environment.

Note that, in a case where it is not possible to display all of the description of the connection port name or the like due to limitations of space of the component, only a part of the name is illustrated for convenience. For example, in a case where the exercise modeling screen 140 displayed on the monitor 14a is enlarged and displayed, an entire character string that is not illustrated may be displayed. Furthermore, by moving a cursor on the character string of which only a part is illustrated, the entire character string which is not illustrated may be displayed by using a method such as pop-up, and various modifications can be implemented.

Figure 20:
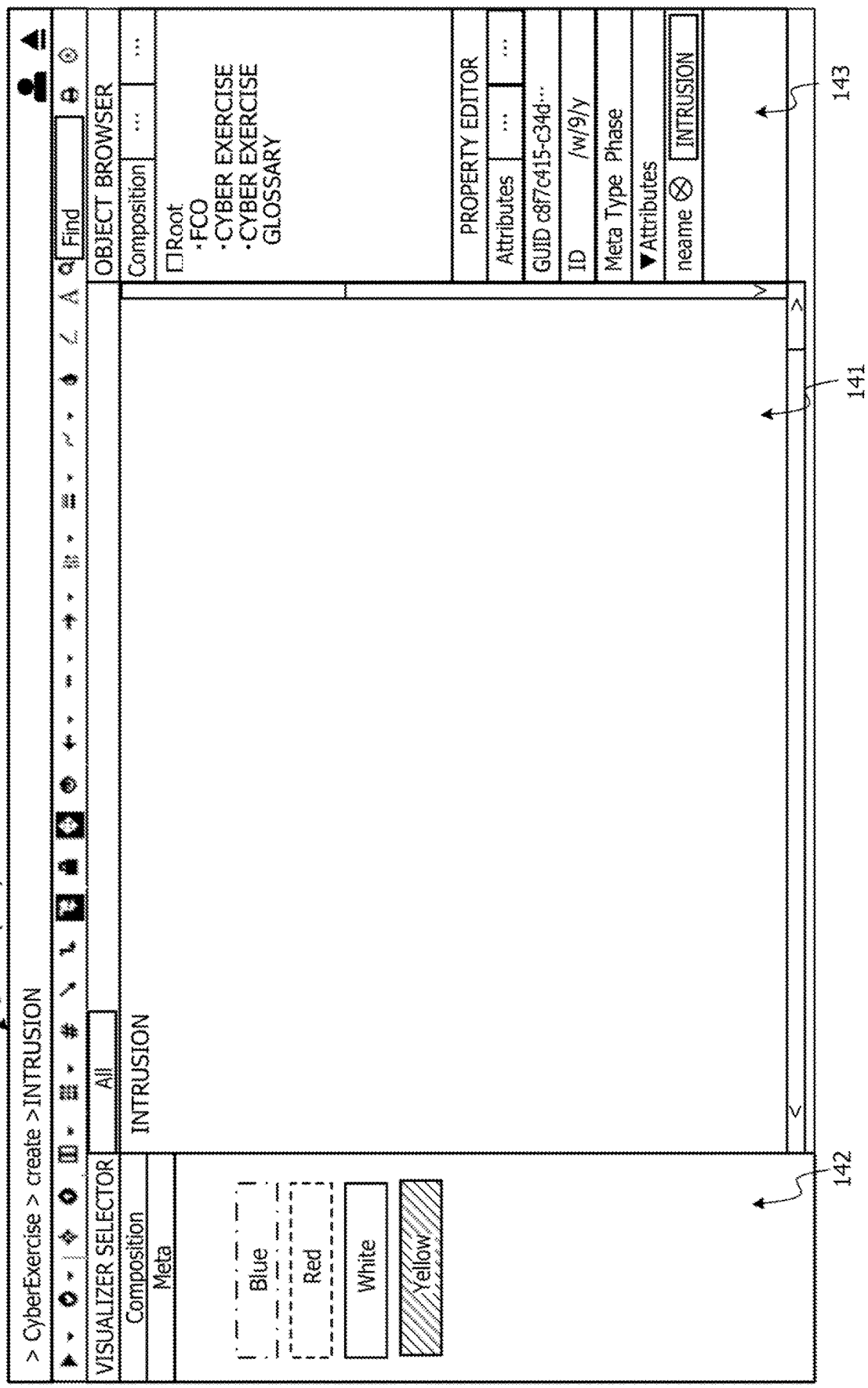
FIG. 20 is a diagram for explaining an input operation example by an operator to create a cyber exercise scenario model in the exercise builder as an example of the embodiment.
Figure 21:
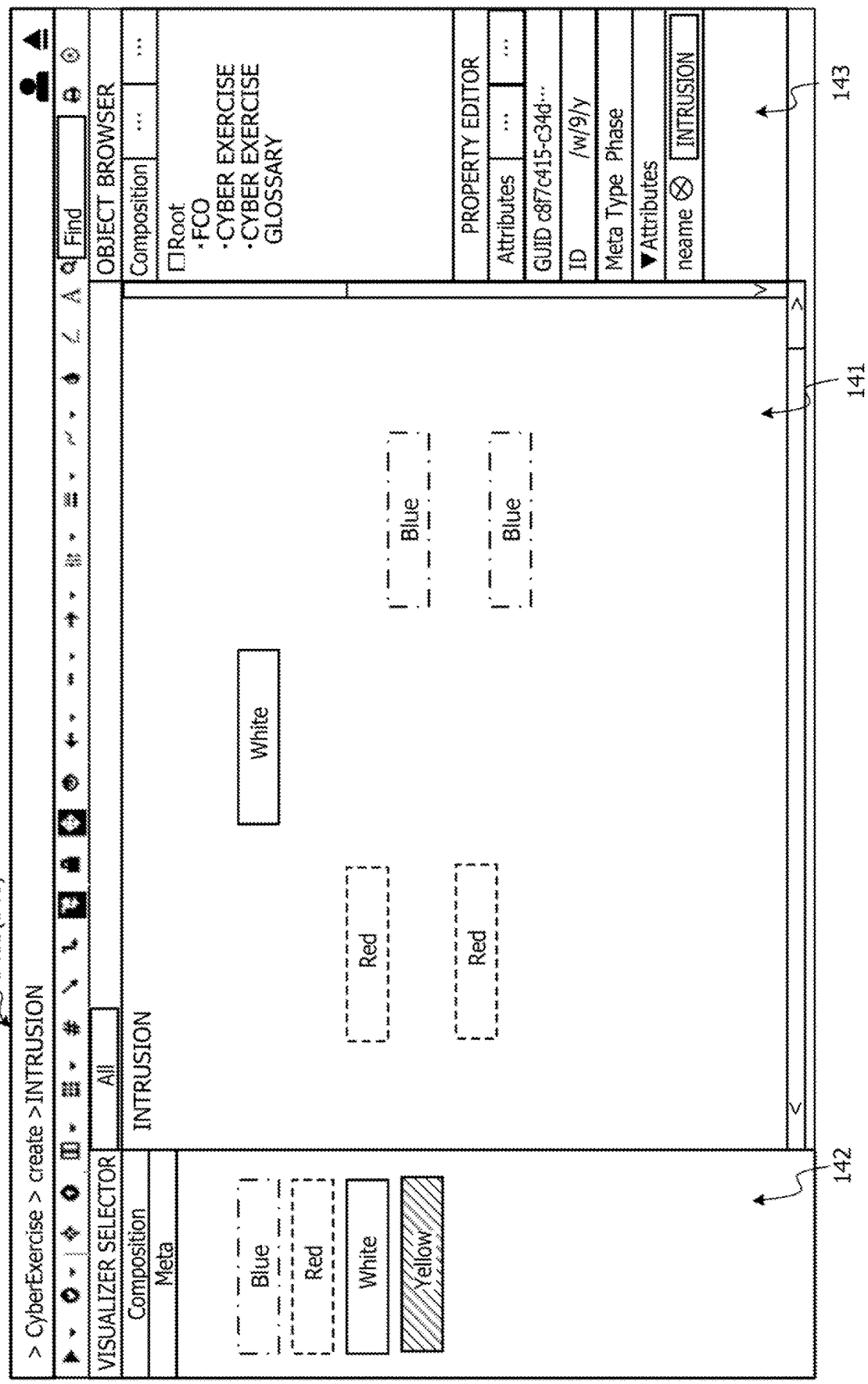
FIG. 21 is a diagram for explaining an input operation example by the operator to create the cyber exercise scenario model in the exercise builder as an example of the embodiment.

FIGS. 20 and 21 are diagrams illustrating transitions of the exercise modeling screen 140b (140) and illustrate a process of defining a configuration of the intrusion phase.

For example, on the exercise modeling screen 140b illustrated in FIG. 15, the operator double-clicks, for example, and selects a component of the intrusion phase displayed in the work region 141 so as to start to set a scene included in the intrusion phase.

In the component display region 142, components according to a plurality of types of roles participating in the cyber exercise are illustrated. In the example illustrated in FIG. 20, four types of components including Red, Blue, White, and Yellow are illustrated, and these four types of components respectively correspond to the roles including attack, defense, command and supervision, and exercise environment in the cyber exercise.

On the exercise modeling screen 140b illustrated in FIG. 20, the operator selects the component of the scene configuring the intrusion phase from the component display region 142 and drags the selected component to the work region 141.

As a result of this operation, in the exercise modeling screen 140b illustrated in FIG. 21, two Red (attack side) scenes, two Blue (defense side) scenes, and a single White (explanation) scene are arranged.

The operator may change the name of the component arranged in the work region 141 as needed and, for example, sets "start access to drinking fountain" to one of the components of the Blue (defense side) scene.

For example, the operator selects the component of the "start access to drinking fountain" scenes by performing the double-clicks or the like by using the mouse 15b or the like. As a result, input an action or an event included in the "start access to drinking fountain" scene are started.

FIGS. 22 to 25 are diagrams illustrating transitions of the exercise modeling screen 140c (140) and illustrate a process of defining a configuration of the "start access to drinking fountain" scene.

Figure 22:
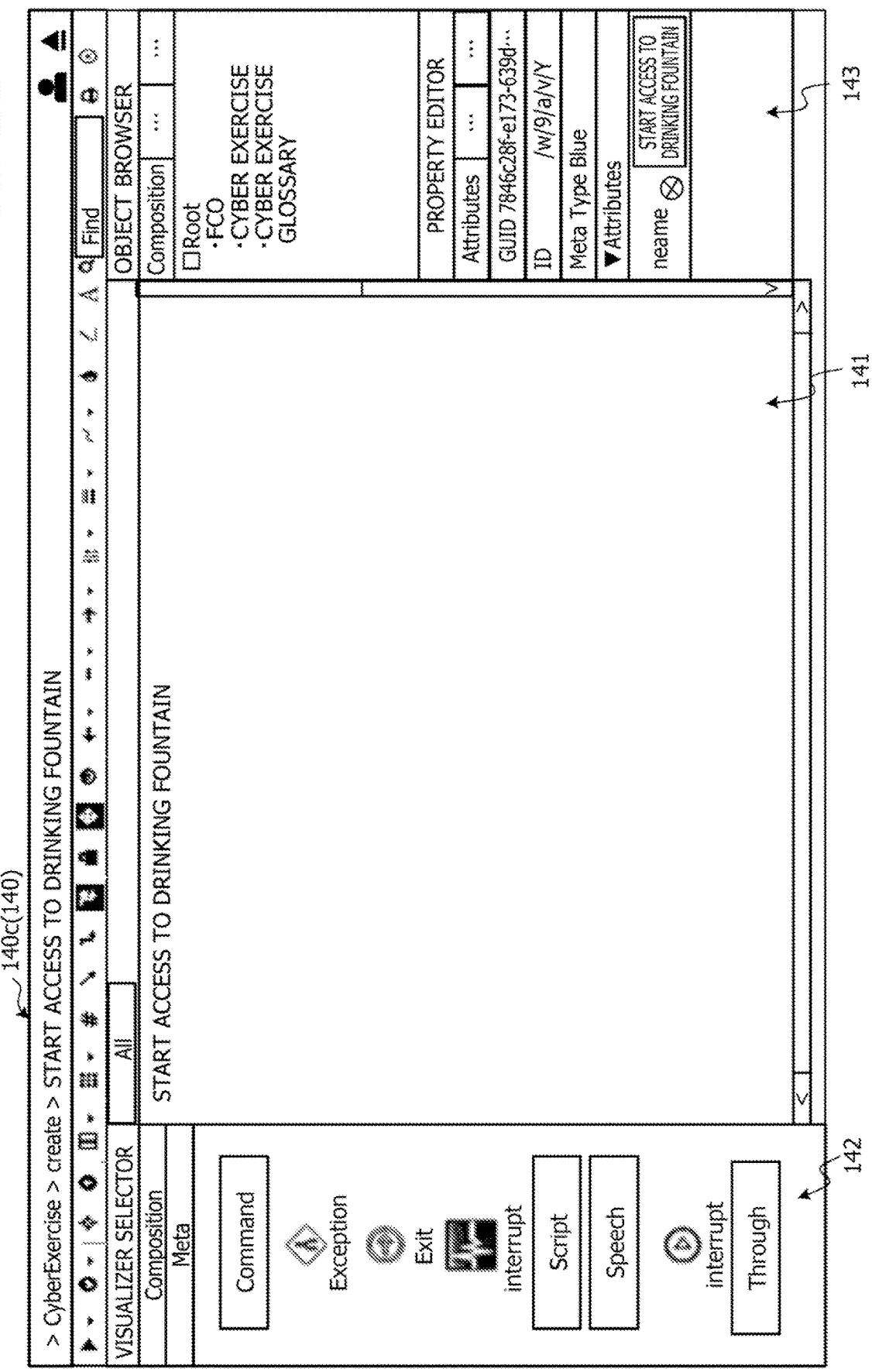
FIG. 22 is a diagram illustrating a transition of the exercise modeling screen of the exercise builder as an example of the embodiment.

In the example illustrated in FIG. 22, in the component display region 142 of the exercise modeling screen 140c, a rectangular component in which Command, Script, Speech, Through, or the like is described is illustrated as the component of the action included in the scene. Furthermore, as the event included in the scene, a component in which Start, Exception, Exit, Interrupt, or the like is described is illustrated.

The operator selects the component of the action or the event included in the "start access to drinking fountain" scene from the component display region 142 in such an exercise modeling screen 140c illustrated in FIG. 22 and drags the selected component to the work region 141.

Figure 23:
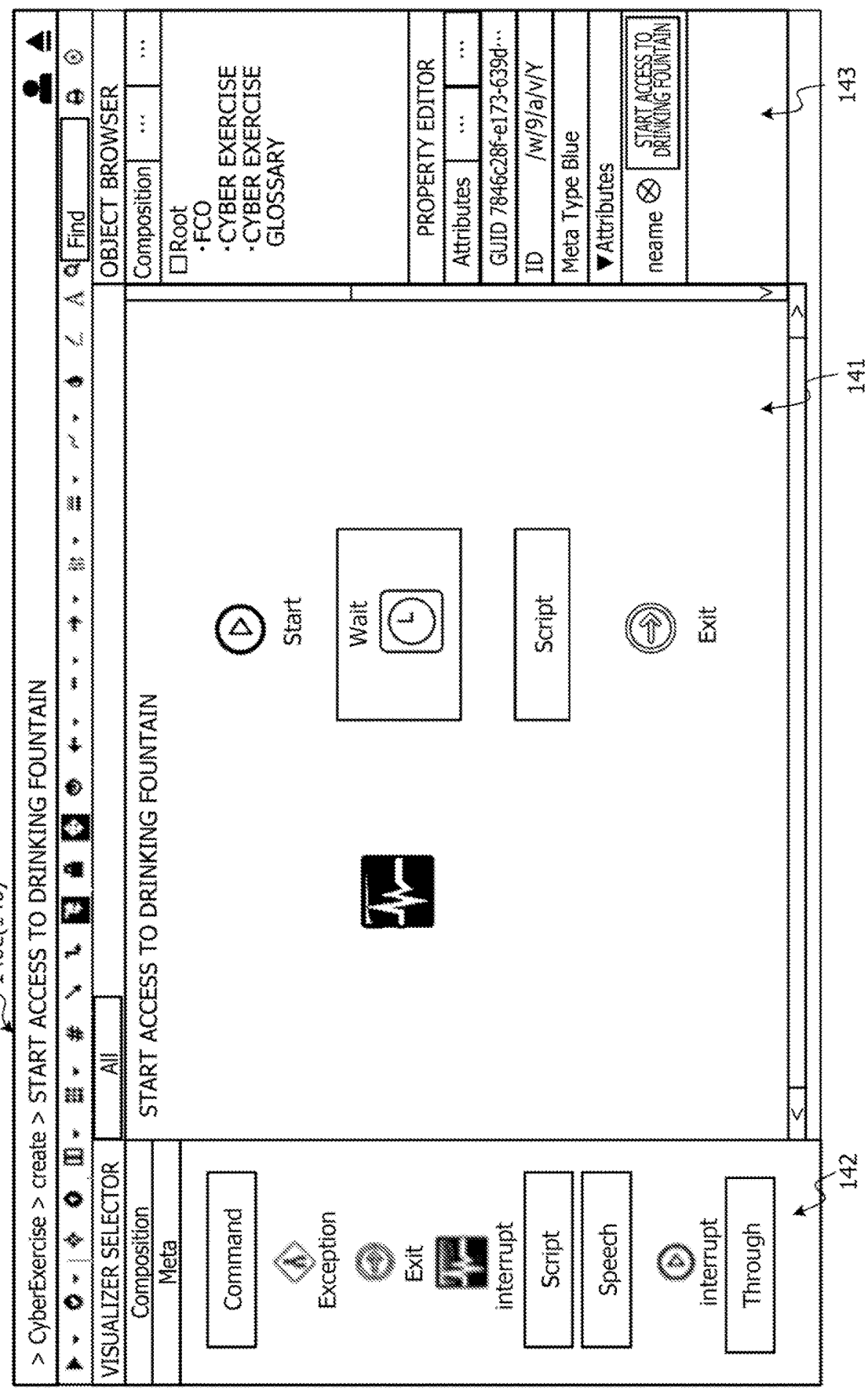
FIG. 23 is a diagram illustrating a transition of the exercise modeling screen of the exercise builder as an example of the embodiment.

In the example illustrated in FIG. 23, a component of each of the events of Start, Exit, and Interrupt and rectangular action components of Wait and Script are set in the work region 141.

Figure 24:
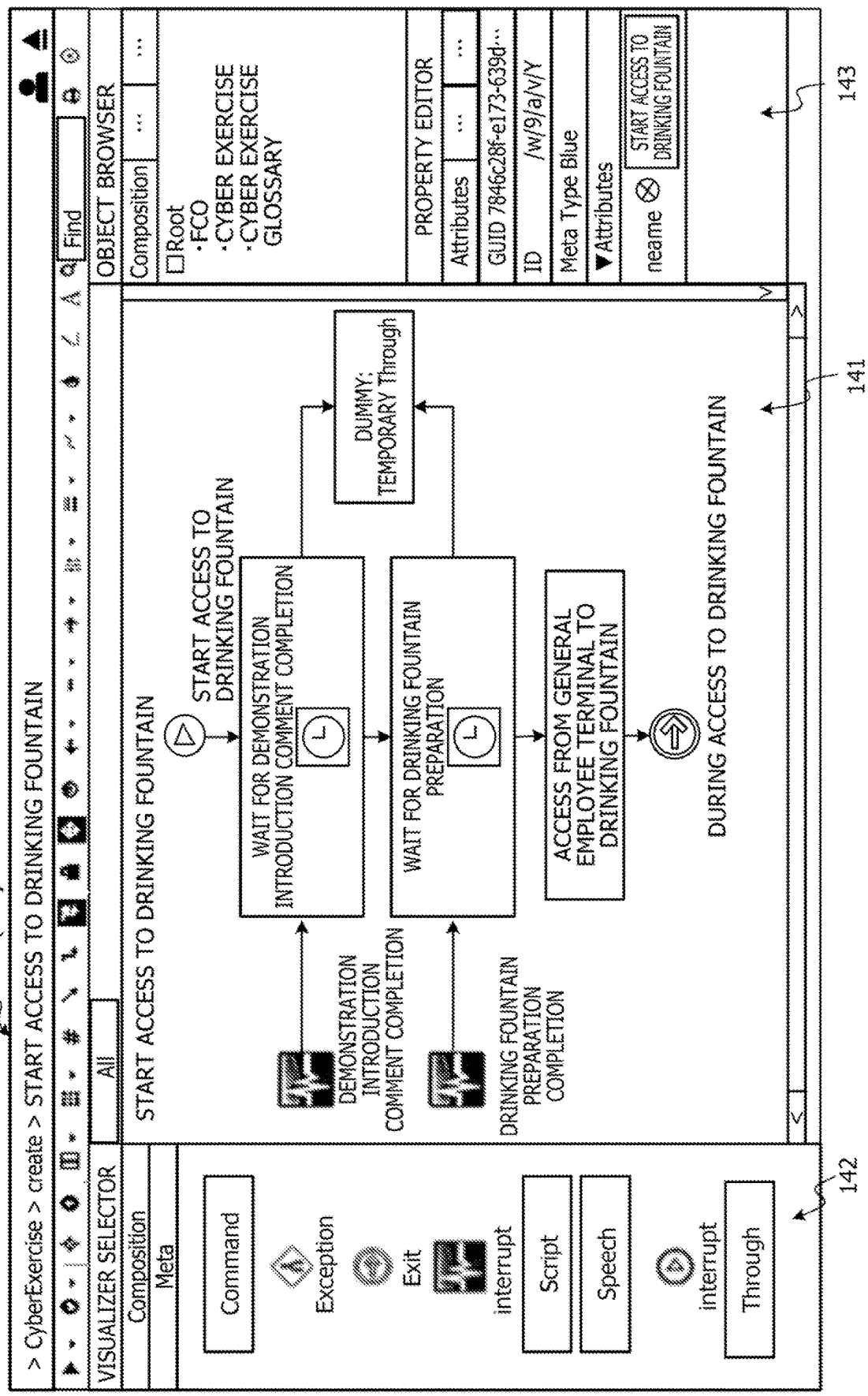
FIG. 24 is a diagram illustrating a transition of the exercise modeling screen of the exercise builder as an example of the embodiment.

The operator may change the name of the component arranged in the work region 141 as needed (refer to FIG. 24).

The operator sets a connection line between the components arranged in the work region 141. For example, the connection line is set by selecting an arrow icon from among a plurality of icons arranged on the upper side of the work region 141 by using the mouse 15b or the like, and then, selecting a connection source component and a connection destination component.

Figure 25:
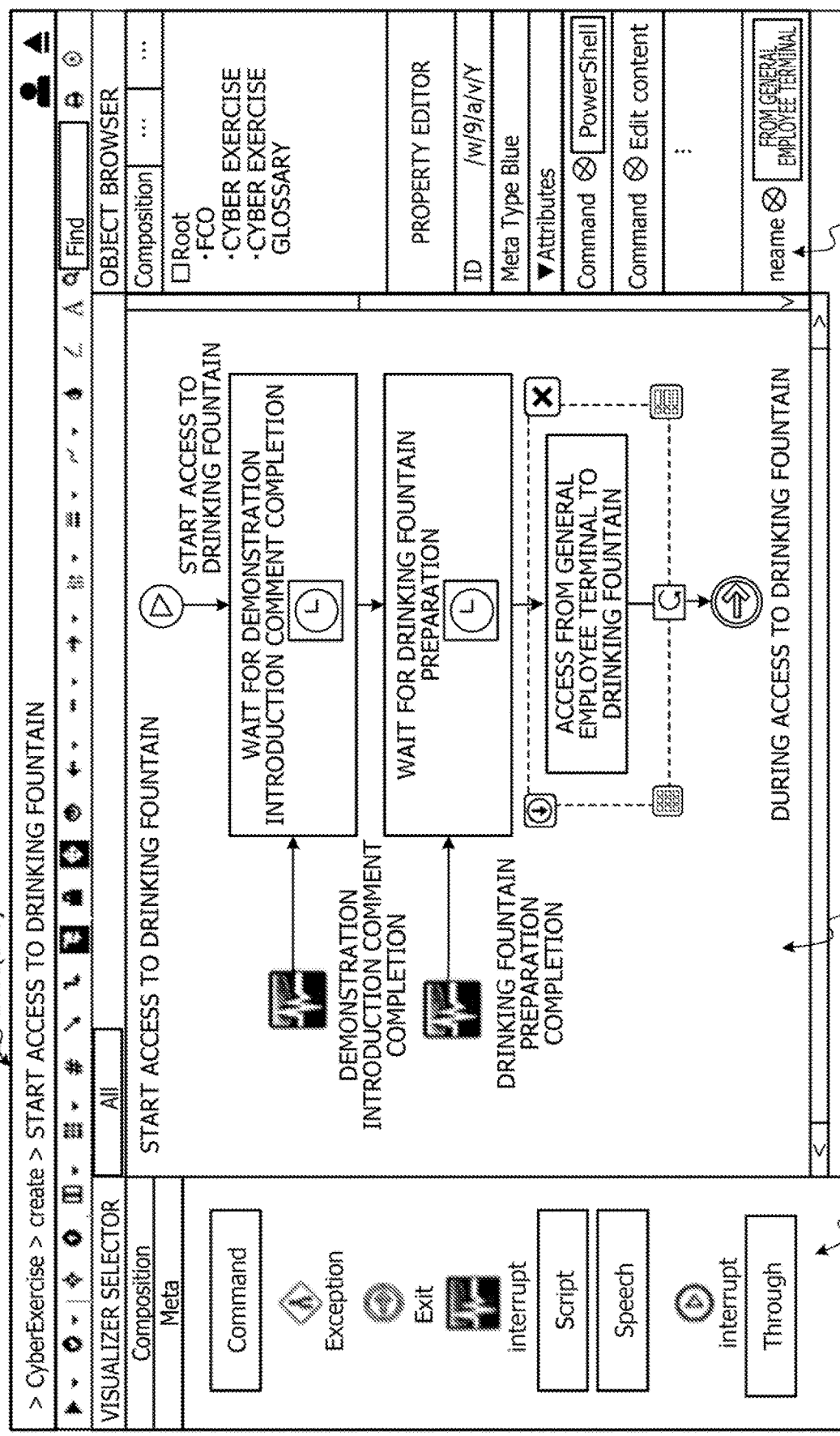
FIG. 25 is a diagram illustrating an exercise modeling screen showing a scene configuration of an intrusion phase.

In FIG. 25, an example is illustrated in which an input regarding the component of the "start access from general employee terminal to drinking fountain site" action is input. By selecting the component of the "start access from general employee terminal to drinking fountain site" action in the work region 141, information regarding the component of the "start access from general employee terminal to drinking fountain site" action is displayed in the information display region 143. The operator inputs the information displayed in this information display region 143 as needed.

Similarly, the operator sets an action, an event, or the like to each scene configuring the intrusion phase.

Figure 26:
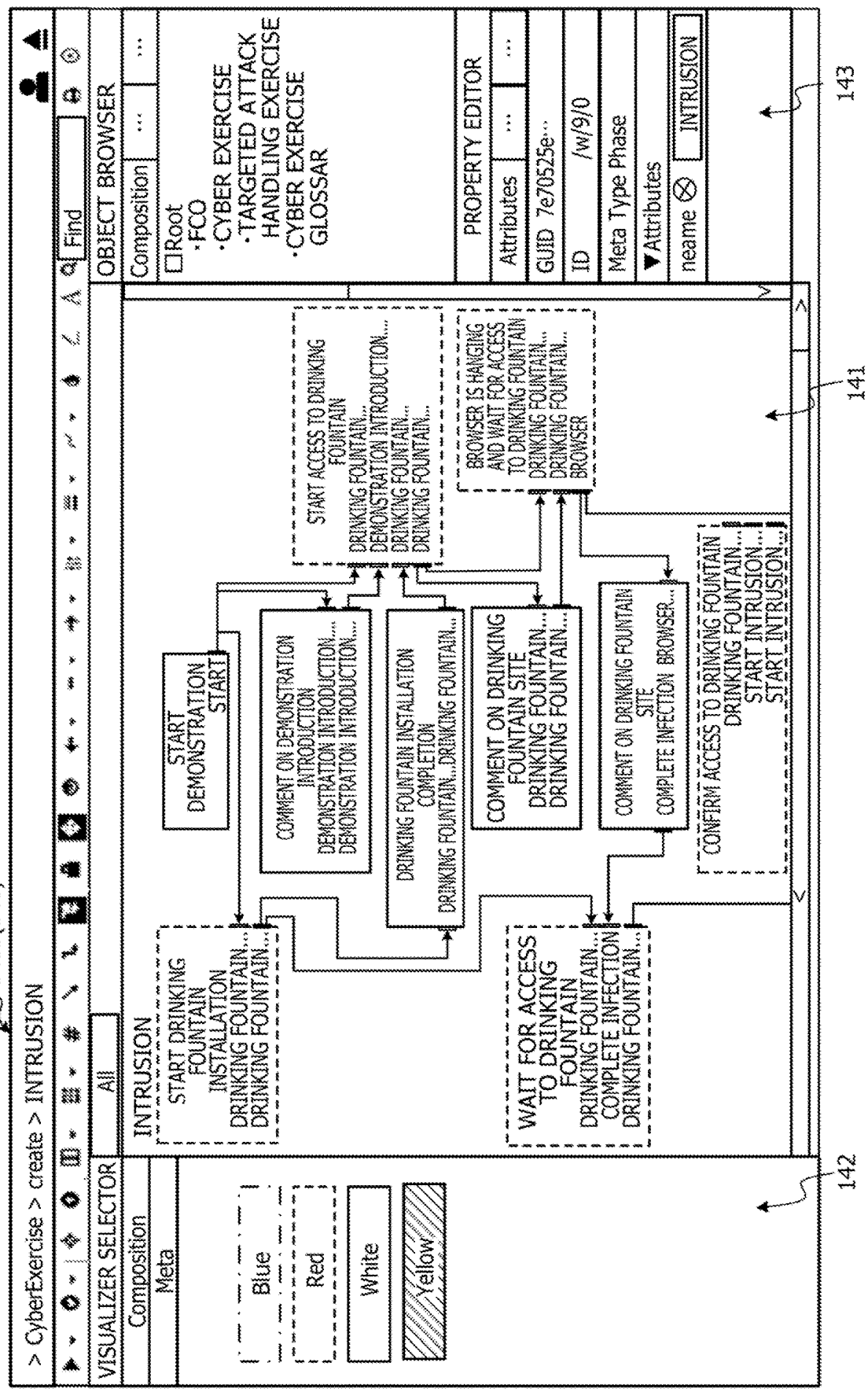
FIG. 26 is a diagram illustrating an exercise modeling screen showing the scene configuration of the intrusion phase.

FIG. 26 illustrates the exercise modeling screen 140b (140) showing a scene configuration of the intrusion phase.

In the exercise modeling screen 140b illustrated in FIG. 26, a state is illustrated where the action, the event, or the like is set to each scene configuring the intrusion phase and the connection line connects between the phases.

Figure 27:
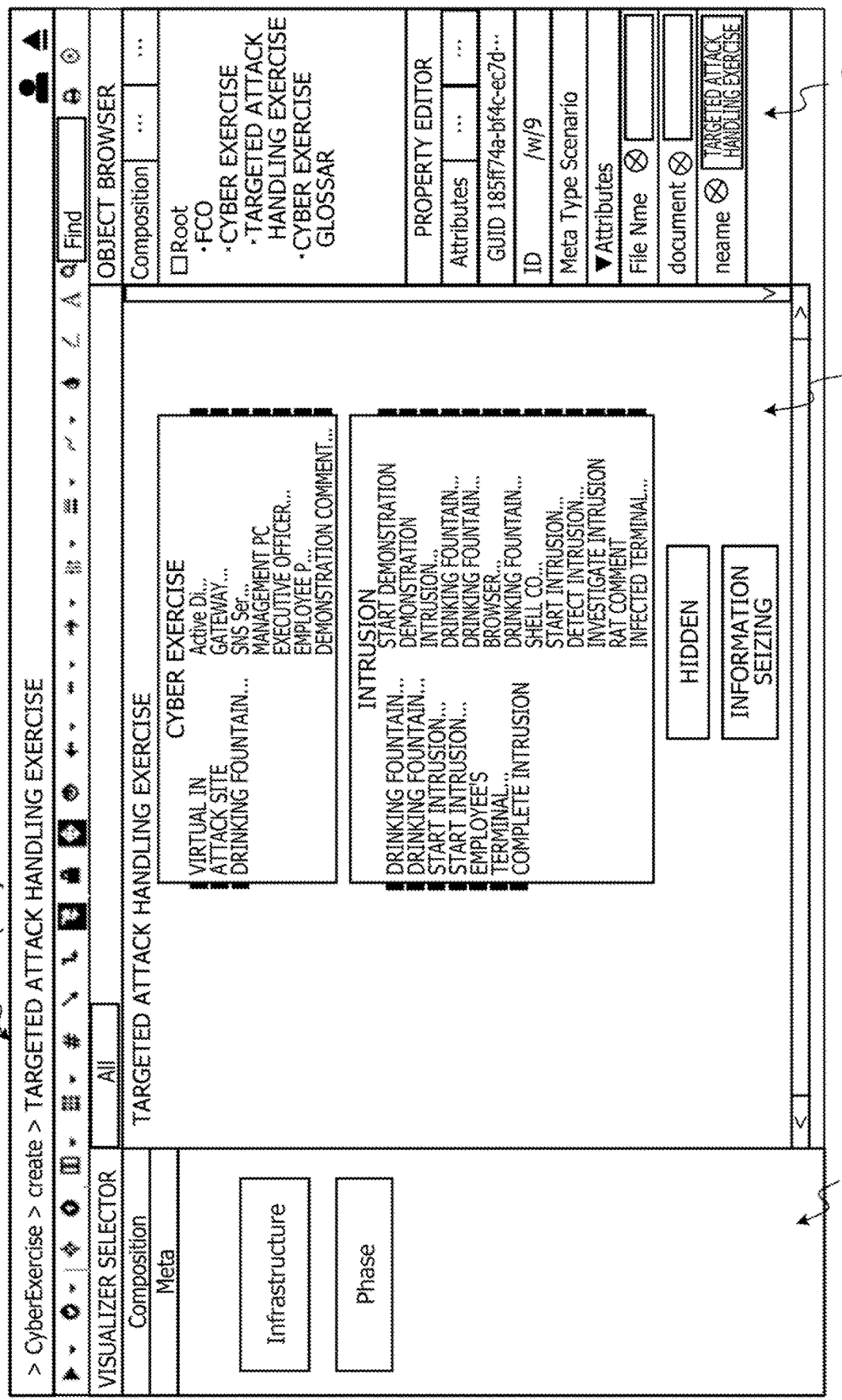
FIG. 27 is a diagram illustrating an exercise modeling screen showing the exercise environment and the phase of the targeted attack handling exercise.

FIG. 27 illustrates the exercise modeling screen 140a (140) showing the exercise environment and the phases of the targeted attack handling exercise.

In the exercise modeling screen 140a illustrated in FIG. 27, a state is illustrated where setting of a cyber exercise scenario model of the intrusion phase is completed.

As described above, the action or the event set to the "start access to drinking fountain" scene is used as the connection port of the component of the "start access to drinking fountain" scene. For example, an action name or an event name of the action or the event included in the scene is set to the port name of the connection port of the scene. Then, these connection ports are connected to a connection port of another scene via the connection line.

For example, a component indicating each scene configuring the intrusion phase set as described above is used as the connection port of the component of the intrusion phase. For example, a plurality of scenes included in the intrusion phase or the like is set to the port name of the connection port of the component of the intrusion phase.

The operator creates a cyber exercise scenario model of each phase included in the targeted attack handling exercise by a similar method.

After setting the cyber exercise scenario model to all the phases of the targeted attack handling exercise, the operator sets a connection line that connects between the connection ports in the exercise environment and each phase.

Figure 28:
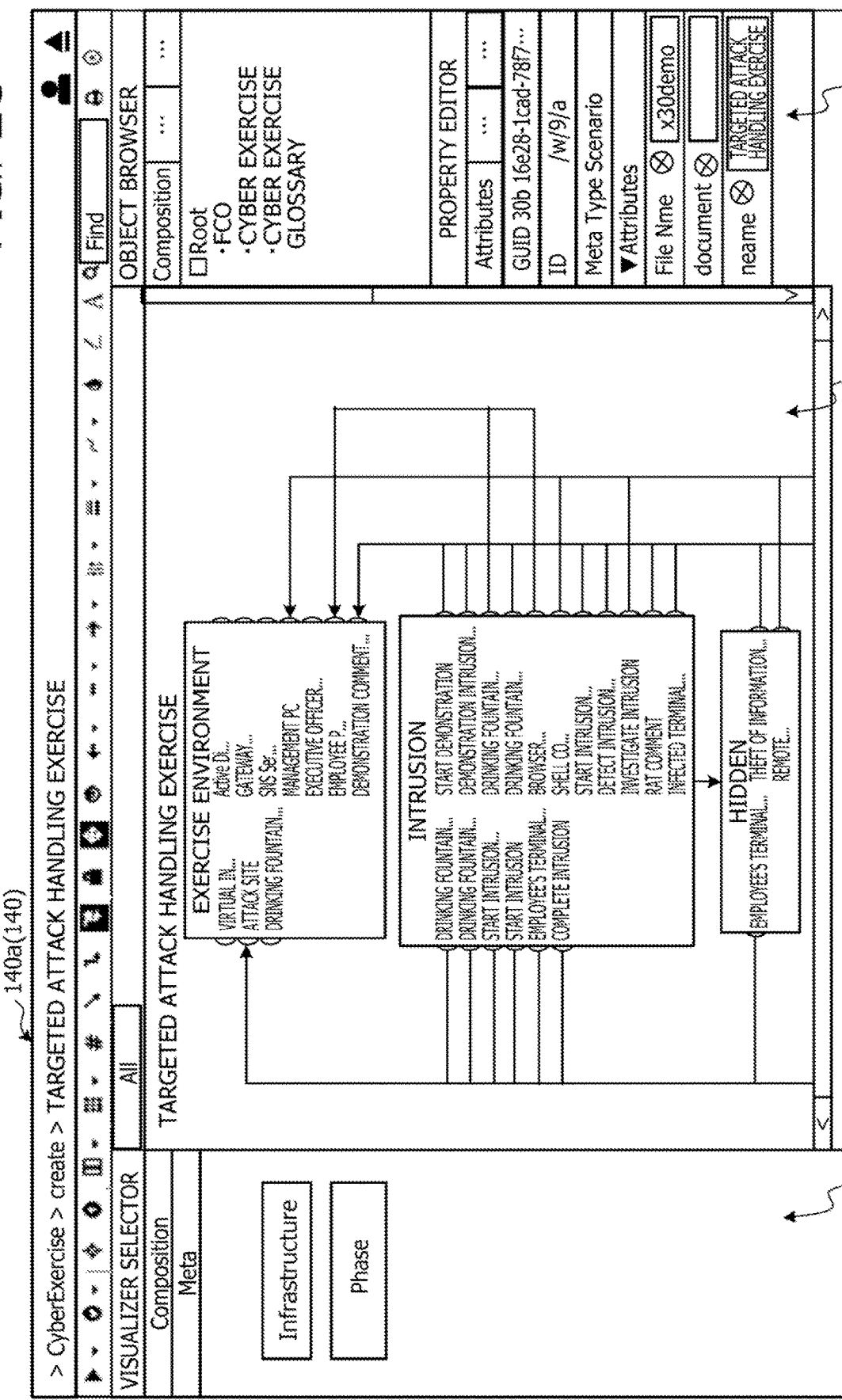
FIG. 28 is a diagram illustrating an exercise modeling screen showing the exercise environment and the phase of the targeted attack handling exercise.

FIG. 28 illustrates the exercise modeling screen 140a (140) showing the exercise environment and the phases of the targeted attack handling exercise.

The connection line is set, for example, by selecting an arrow icon arranged on the upper side of the work region 141 by using the mouse 15b or the like by the operator, and then, selecting a connection source connection port and a connection destination connection port.

Furthermore, the operator may describe a script in the exercise builder 2.

FIG. 29 is a diagram illustrating a script description screen of the exercise builder 2 as an example of the embodiment.

For example, in a case where the operator selects a component of Script from the component display region 142 of the exercise modeling screen 140c illustrated in FIG. 23, arranges the selected component in the work region 141, and selects this Script component by a method such as double-clicking, an editor illustrated in FIG. 29 is activated. The operator may describe the script by using a function as such an editor.

Next, scenario definition file creation processing by the scenario definition file creation unit 202 of the exercise builder 2 as an example of the embodiment will be described according to the flowcharts (steps A1 to A6, B1 to B7, C1 to C6, and D1 to D7) illustrated in FIGS. 30 to 33.

Figure 30:
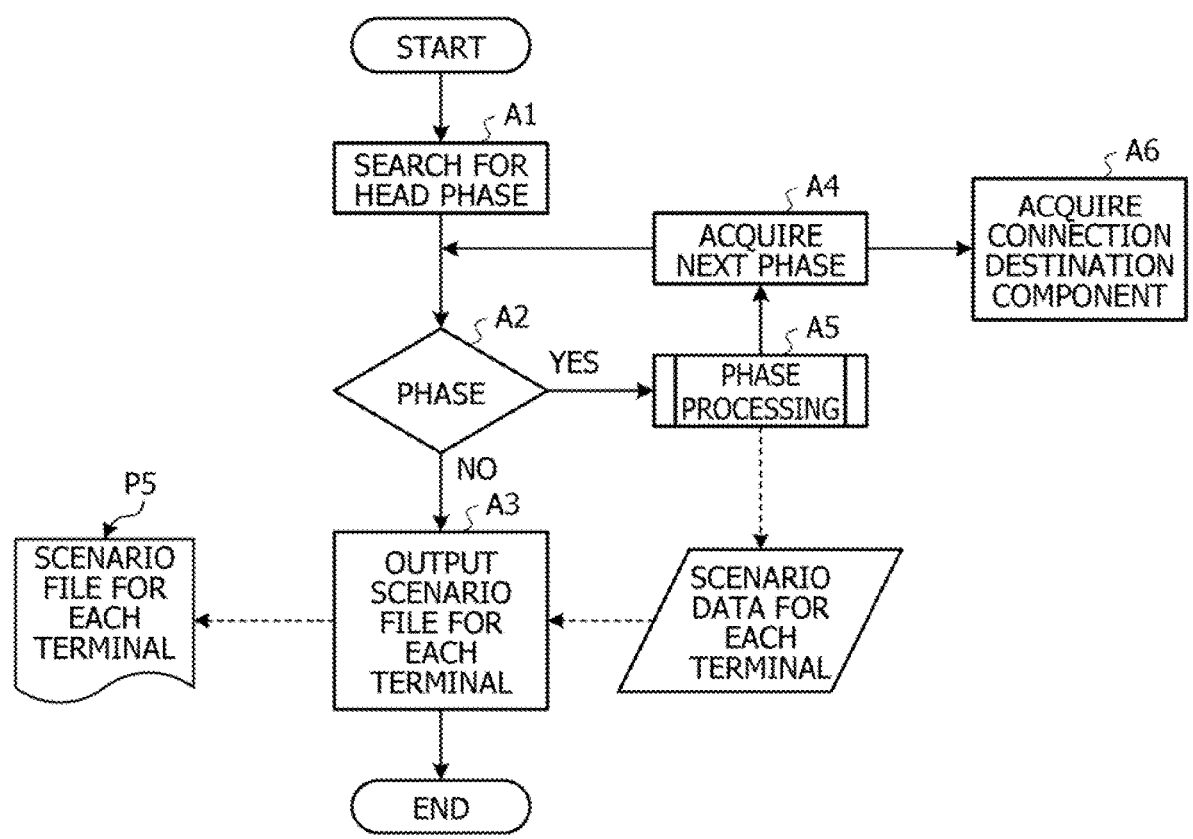
FIG. 30 is a flowchart for explaining scenario definition file creation processing by a scenario definition file creation unit of the exercise builder as an example of the embodiment.

First, processing of outputting a scenario file for each execution terminal by the scenario definition file creation unit 202 of the exercise builder 2 as an example of the embodiment will be described according to the flowchart (steps A1 to A6) illustrated in FIG. 30.

In step A1, the scenario definition file creation unit 202 searches for a head phase of the cyber exercise scenario model. In step A2, the scenario definition file creation unit 202 confirms a phase in which creation of phase data is unprocessed among a plurality of phases included in the cyber exercise scenario model.

As a result of the confirmation, in a case where the unprocessed phase exists (refer to "YES" route in step A2), the procedure proceeds to step A5. In step A5, processing of creating the phase data with respect to the phase (phase processing) is executed. The scenario definition file creation unit 202 generates scenario data (scenario definition file) for each terminal. Note that details of processing of generating the phase data with respect to the phase in step A5 will be described later with reference to the flowchart illustrated in FIG. 31. The scenario definition file creation unit 202 stores event data with terminal information in the phase data regarding the phase generated in step A5 in the scenario data for each terminal. The scenario data is stored in, for example, the predetermined storage region such as the memory 12 or the storage device 13.

The scenario data is a group of event data. As described later, the event data is data in which a trigger name and an event name to which a unique name is applied according to a hierarchical structure of phases, scenes, and actions, and an action and an operation when the event is triggered are written.

In step A4, the scenario definition file creation unit 202 acquires a next phase included in the cyber exercise scenario model. Furthermore, when acquiring the phase, the scenario definition file creation unit 202 acquires information regarding a connection destination component of each of the connection lines connected to the phase and the scene, the action, the event, or the like included in the phase and information (step A6). Thereafter, the procedure proceeds to step A2.

As a result of the confirmation in step A2, in a case where there is no unprocessed phase (refer to "NO" route in step A2), the procedure proceeds to step A3.

In step A3, the scenario definition file creation unit 202 outputs the scenario data for each terminal created in step A5 to the scenario definition file for each terminal (refer to arrow P5) and terminates the processing.

Figure 31:
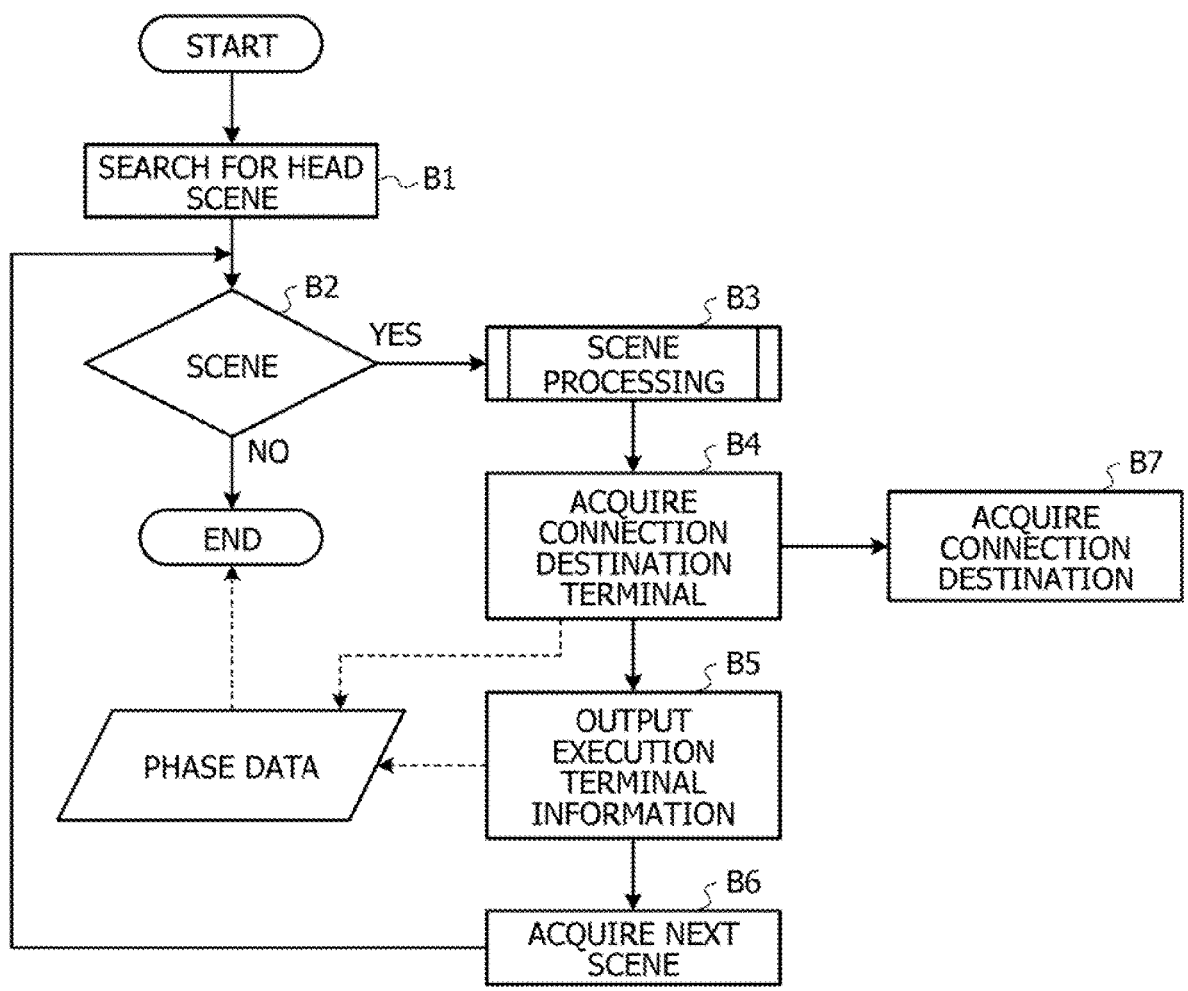
FIG. 31 is a flowchart for explaining the scenario definition file creation processing by the scenario definition file creation unit of the exercise builder as an example of the embodiment.

Next, phase output processing by the scenario definition file creation unit 202 of the exercise builder 2 as an example of the embodiment will be described according to the flowchart (steps B1 to B7) illustrated in FIG. 31. In the phase output processing, phase data of a scene, an action, an event, or the like included in the phase is created.

In step B1, the scenario definition file creation unit 202 searches for a head scene from among a plurality of scenes included in a phase to be processed. The scenario definition file creation unit 202 executes processing in the following steps B2 to B7 from the head scene in order.

In step B2, the scenario definition file creation unit 202 confirms whether or not a scene in which creation of the scenario data is unprocessed is included in the plurality of scenes included in the phase to be processed. As a result of the confirmation, in a case where there is no unprocessed scene (refer to "NO" route in step B2), the processing is terminated.

Furthermore, as a result of the confirmation in step B2, in a case where there is an unprocessed scene (refer to "YES" route in step B2), the procedure proceeds to step B3. In step 3, the scenario definition file creation unit 202 executes scenario data (scene data) creation processing (scene processing) with respect to the scene. Details of the scene data creation processing with respect to the scene will be described later with reference to the flowchart illustrated in FIG. 32. The scenario definition file creation unit 202 stores the generated scene data in the phase data. The phase data is stored, for example, in the predetermined storage region such as the memory 12 or the storage device 13.

As described later, the phase data is a group of the scenario definition files created for each scene and each event (each action). The phase data includes event data for each scene in the phase and terminal information used to execute each scene.

In step B4, the scenario definition file creation unit 202 acquires information regarding a connection destination terminal. The scenario definition file creation unit 202 specifies, for example, which terminal executes a scene of accessing the drinking fountain. This enables the scene and a scene execution terminal to be associated with each other.

In step B7, the scenario definition file creation unit 202 acquires information regarding a component of a connection destination of each of the connection lines connected to the scene and the action, the event, or the like included in the scene.

In step B5, the scenario definition file creation unit 202 stores information regarding the terminal (execution terminal) that executes the scene in the phase data. For example, the scenario definition file creation unit 202 stores, in the phase data, information used to identify the terminal used by the exercising person in association with identification information (scene ID) used to specify the scene.

In step B6, the scenario definition file creation unit 202 acquires a next scene. Furthermore, when acquiring the scene, the scenario definition file creation unit 202 acquires information regarding the component of the connection destination of each of the connection lines connected to the scene and the action, the event, or the like included in the scene (step B7). Thereafter, the procedure returns to step B2.

Figure 32:
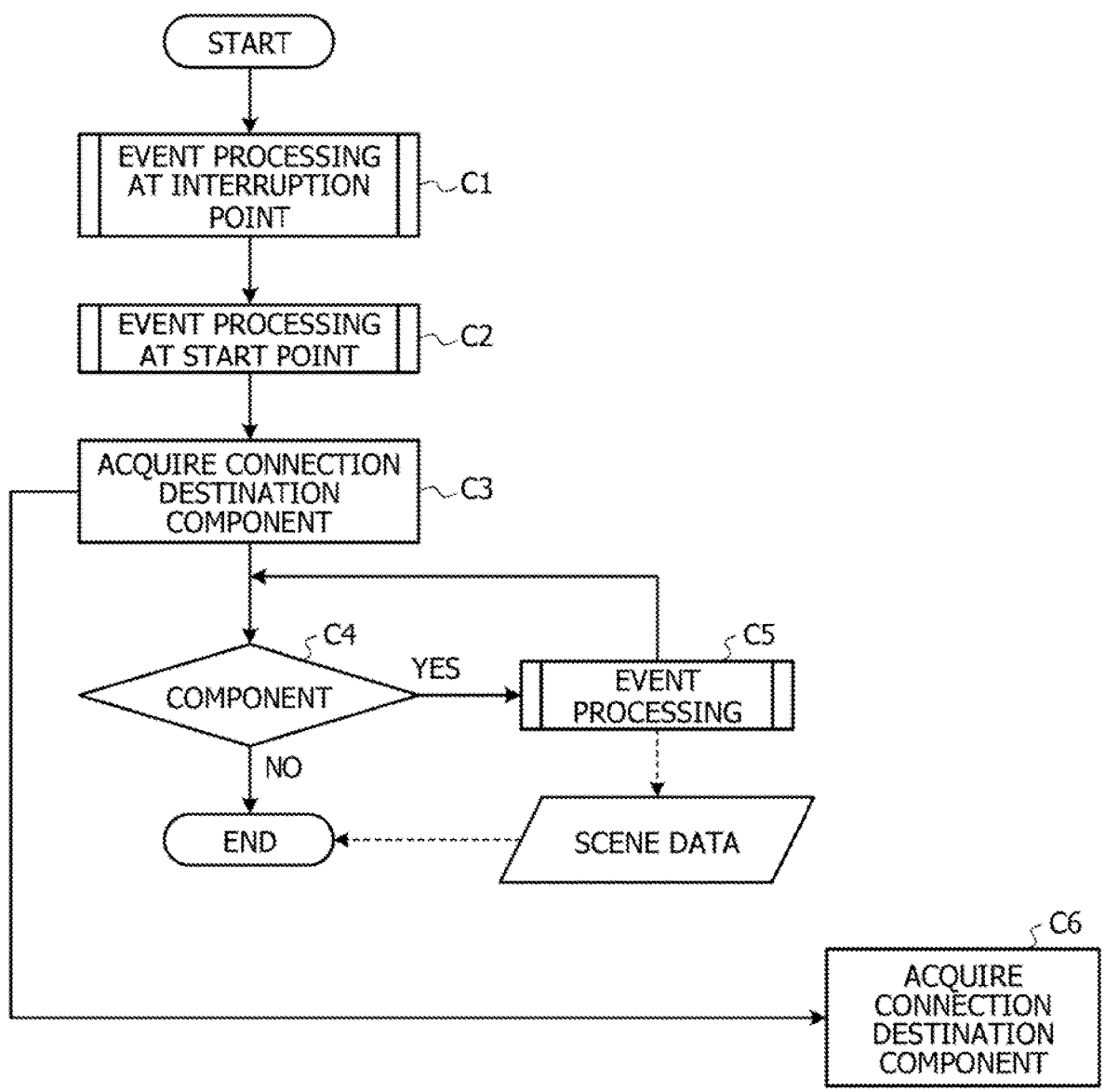
FIG. 32 is a flowchart for explaining the scenario definition file creation processing by the scenario definition file creation unit of the exercise builder as an example of the embodiment.

Next, scene output processing by the scenario definition file creation unit 202 of the exercise builder 2 as an example of the embodiment will be described according to the flowchart (steps C1 to C6) illustrated in FIG. 32. In the scene output processing, a scenario definition file regarding an event or an action included in a scene is created.

In step C1, the scenario definition file creation unit 202 executes processing on an event at an interruption point among the plurality of components included in the scene to be processed. Details of the processing on the event at the interruption point will be also described later with reference to FIG. 33.

In step C2, the scenario definition file creation unit 202 executes processing on an event at a start point among a plurality of components included in a scene to be processed. Details of the processing on the event at the start point will be described later with reference to FIG. 33.

In step C3, the scenario definition file creation unit 202 acquires information regarding the component of the connection destination of the component by using an action or an event at a point other than the interruption point and the start point in the cyber exercise scenario model as a processing target. Hereinafter, there is a case where the action or the event is simply referred to as an event for convenience.

The scenario definition file creation unit 202 acquires the information regarding the component of the connection destination of each of these connection lines connected to the component and the action, the event, or the like included in the component (step C6).

In step C4, the scenario definition file creation unit 202 confirms whether or not there is an unprocessed component in the connection destination. In a case where there is an unprocessed component in the connection destination (refer to "YES" route in step C4), the procedure proceeds to step C5. In step C5, the scenario definition file creation unit 202 executes event data creation processing with respect to the component (action or event). Details of the event data creation processing with respect to the event will be described later with reference to the flowchart illustrated in FIG. 33. The scenario definition file creation unit 202 stores the event data created by the event processing in the scene data. The scene data is stored, for example, in the predetermined storage region such as the memory 12 or the storage device 13.

The event data includes an event name, a trigger name, a trigger condition, an action, a script, an event, or the like as described later. In addition, an operation procedure, an evaluation procedure, a commentary sentence, or the like may be included.

As a result of the confirmation in step C4, in a case where there is no unprocessed component in the connection destination (refer to "NO" route in step C4), the processing is terminated.

Figure 33:
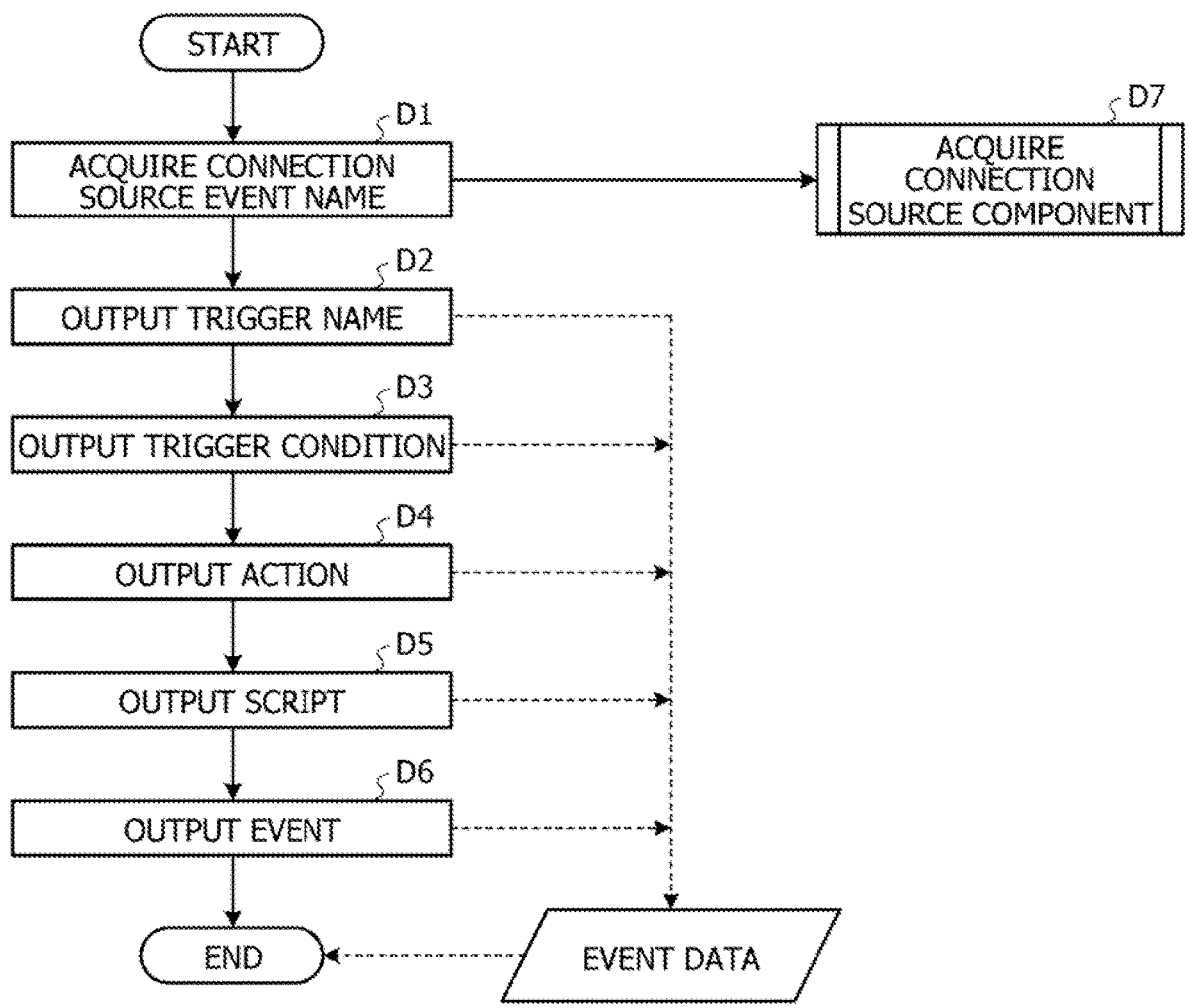
FIG. 33 is a flowchart for explaining event output processing by the scenario definition file creation unit of the exercise builder as an example of the embodiment.

Next, the event data creation processing by the scenario definition file creation unit 202 of the exercise builder 2 as an example of the embodiment will be described according to the flowchart (steps D1 to D7) illustrated in FIG. 33. In the event data creation processing, data regarding conditions and content under which an action or an operation is performed at the time when the event occurs, and an event to be newly generated is created.

In step D1, the scenario definition file creation unit 202 acquires the event name of the connection source of the event to be processed. Furthermore, the scenario definition file creation unit 202 acquires the information regarding the component of the connection source of the connection line connected to the event (step D7). Details of the connection source component information acquisition processing will be described later with reference to the flowchart illustrated in FIG. 34.

In step D2, the scenario definition file creation unit 202 outputs a trigger name to the event data. The trigger name is set by the scenario definition file creation unit 202, for example, in the processing of the flowchart illustrated in FIG. 34 described later. The event data is stored, for example, in the predetermined storage region such as the memory 12 or the storage device 13.

In step D3, the scenario definition file creation unit 202 outputs a trigger condition to the event data. The scenario definition file creation unit 202 may use, for example, confirmation of an input from the connection source event name acquired in step D1 as a trigger condition.

In steps D4 and D5, the scenario definition file creation unit 202 outputs an action or a script performed by the component to the event data. The scenario definition file creation unit 202 outputs, for example, content of the action set to the component of the event in the exercise modeling screen 140 by the operator to the event data. The content of the action may be generated by the component when the event occurs and the trigger condition is satisfied, such as an explanatory text, an action procedure, an operation procedure, an operation script, an evaluation script, a display message, or the like.

In step D6, the scenario definition file creation unit 202 outputs the event name if any event is generated after the execution of the action. A plurality of event names may be output according to the result of the action (success, failure, or the like).

Thereafter, the processing is terminated. The event data to which various data is output in each step is used as a scenario definition file regarding the event. The event data may be written, for example, as a JavaScript Object Notation (JSON) file.

Figure 34:
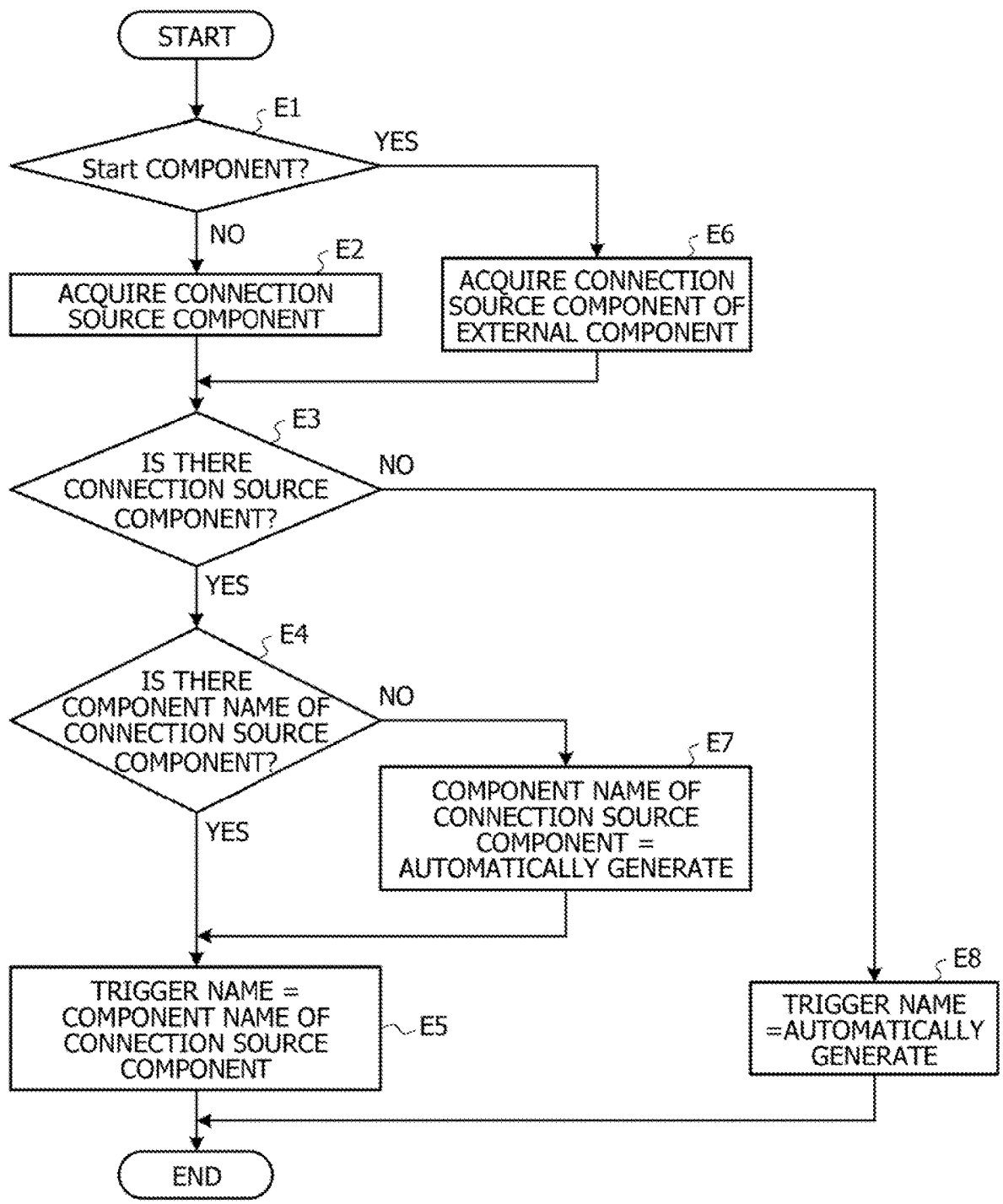
FIG. 34 is a flowchart for explaining connection source component information acquisition processing by the scenario definition file creation unit of the exercise builder as an example of the embodiment.

Next, the connection source component information acquisition processing by the scenario definition file creation unit 202 of the exercise builder 2 as an example of the embodiment will be described according to the flowchart (steps E1 to E8) illustrated in FIG. 34.

In step E1, the scenario definition file creation unit 202 confirms whether or not a component to be processed is a head (start: Start) component of the processing.

As a result of the confirmation, in a case where the component to be processed is not the start component (refer to NO route in step E1), the procedure proceeds to step E2.

In step E2, the scenario definition file creation unit 202 acquires a connection source (upstream side) component along a connection line connected to the component. On the other hand, in a case where the component to be processed is the start component (refer to YES route in step E1), the scenario definition file creation unit 202 acquires the upper component (external component) containing the component (step E6). For example, the external component is a component configuring a scene with respect to the event and is a component configuring a phase with respect to a component configuring the scene, for example.

In step E3, the scenario definition file creation unit 202 confirms whether or not there is a connection source component. As a result of the confirmation, in a case where there is no connection source component (refer to NO route in step E3), the procedure proceeds to step E8. In step E8, the scenario definition file creation unit 202 generates (automatically generate) a trigger name. The scenario definition file creation unit 202 sets the trigger name on the basis of a rule defined in advance. The scenario definition file creation unit 202 may set the trigger name, for example, by adding a serial number to combinations of alphanumerical characters. Thereafter, the processing is terminated.

As a result of the confirmation in step E3, in a case where there is a connection source component (refer to YES route in step E3), the procedure proceeds to step E4. In step E4, the scenario definition file creation unit 202 confirms whether or not a component name is set to the connection source component.

As a result of the confirmation, in a case where the component name is not set to the connection source component (refer to NO route in step E4), the procedure proceeds to step E7. In step E7, the scenario definition file creation unit 202 generates (automatically generate) the component name and sets the component name to the connection source component. Thereafter, the procedure proceeds to step E5.

Furthermore, as a result of the confirmation in step E4, in a case where the component name is set to the connection source component (refer to YES route in step E4), the procedure proceeds to step E5. In step E5, the scenario definition file creation unit 202 sets the component name of the connection source component as a trigger name and terminates the processing.

(C) Effect

FIG. 36 is a diagram for explaining an effect by the exercise builder 2 as an example of the embodiment.

According to the exercise builder (cyber exercise builder) 2, an executor of the cyber exercise (operator of exercise builder 2) arranges the components in the work region 141 of the exercise modeling screen 140 by using the exercise editor 201. Furthermore, the executor of the cyber exercise sets a relationship between the components by connecting between the components arranged in the work region 141 by the connection line. By performing these operations, the executor of the cyber exercise can easily create and edit the cyber exercise scenario model.

The exercise builder 2 receives information regarding the plurality of program components used to execute the cyber exercise and the connection line connecting between the program components input by the operator. Then, by combining the plurality of program components on the basis of the connection line, the cyber exercise scenario is generated. This makes it possible to easily create texts used for the cyber exercise and easily create and edit the cyber exercise scenario.

Furthermore, in the exercise builder 2, the scenario definition file creation unit 202 creates the scenario definition file in which the scenario of the cyber exercise (cyber exercise scenario) is written on the basis of the created cyber exercise scenario model.

The scenario definition file creation unit 202 extracts the component name (phase name, scene name, and action name) of each component included in the cyber exercise scenario model and the connection port name included in each component. Then, the scenario definition file creation unit 202 acquires the information regarding the component of the connection source of the connection line connected to each component, from the cyber exercise scenario model.

Then, the scenario definition file creation unit 202 creates the scenario definition file by setting the component name of the connection source component as a trigger name. By making the exercise execution processing unit 3 and the script automatic execution processing unit 5 read this scenario definition file, instruction of a timing of generating various events, instruction content display, an operation procedure instruction, selection of an event to be generated next, or the like can be assisted. Therefore, the exercise builder 2 can largely reduce a workload of the executor.

In a case where the event name is not set to the connection source event, the scenario definition file creation unit 202 automatically generates the event name corresponding to the component. As a result, even in a case where the event to which the event name is not set is included, the scenario definition file can be created.

The scenario definition file creation unit 202 creates the scenario definition file for each event (component) included in the cyber exercise. Because the cyber exercise scenario model created in this way is modularized, the cyber exercise scenario model can be easily edited or reused, and the cyber exercise scenario can be easily changed or expanded.

The exercise editor 201 can construct the exercise environment, and this also makes it possible to largely reduce the workload of the executor.

Furthermore, the executor can obtain high evaluation by executing the cyber exercise.

On the other hand, it is possible to obtain experience against cyber attacks by executing the cyber exercise, and it is possible to promote training of the participant of the cyber exercise.

By using the cyber exercise system 1 including the exercise builder 2, the participant can perform the cyber exercise anytime, alone, or many times. Furthermore, a cyber exercise according to a skill or a level of the participant can be executed. The exercise builder 2 can easily make customization, create an avatar, or the like.

The cyber exercise scenario generated by the exercise builder 2 includes both of the first program executed by the first information processing terminal on the attack side and the second program executed by the second information processing terminal on the defense side in the cyber exercise. This makes it possible to create a realistic cyber exercise scenario in consideration of the processing on the attack side and the processing on the defense side.

Furthermore, a program on at least one of the attack side or the defense side may be scripted and automatically executed. For example, this makes it possible to automatically execute the exercise on the attack side and execute the exercise on the defense side. Conversely, it is possible to automate the defense side and execute the exercise on the attack side. Therefore, this is highly convenient. Furthermore, by automatically executing the processing other than a part of the processing, it is possible to execute a part desired to be exercised. This is also highly convenient.

(D) Others

FIG. 35 is a diagram illustrating a hardware configuration of an information processing apparatus that realizes the exercise builder 2 as an example of the embodiment. There is a case where the information processing apparatus that realizes the exercise builder 2 is represented by a reference numeral 2.

As illustrated in FIG. 35, the information processing apparatus (exercise builder) 2 includes a processor 11, the memory 12, the storage device 13, a graphic processing device 14, an input interface 15, an optical drive device 16, a device connection interface 17, and a network interface 18 as components. These components 11 to 18 are configured to be able to communicate with each other via a bus 19.

The processor (processing unit) 11 controls the entire exercise builder 2. The processor 11 may be a multiprocessor. The processor 11 may be, for example, any one of a Central Processing Unit (CPU), a Micro Processing Unit (MPU), a Digital Signal Processor (DSP), an Application Specific Integrated Circuit (ASIC), a Programmable Logic Device (PLD), and a Reid Programmable Gate Array (FPGA). Furthermore, the processor 11 may be a combination of two or more types of elements of the CPU, MPU, DSP, ASIC, PLD, and FPGA.

Then, the processor 11 executes the control program for the exercise builder 2 (exercise builder management program: not illustrated) so as to implement the functions as the exercise editor 201 and the scenario definition file creation unit 202 described above.

The functions as the exercise editor 201 and the scenario definition file creation unit 202 may be implemented, for example, as a function that operates on an Operating System (OS) program or may be implemented as a function of the OS program.

Note that the exercise builder 2 realizes the functions as the exercise editor 201 and the scenario definition file creation unit 202 illustrated in FIG. 2 by executing the program (exercise builder management program or OS program) recorded in a computer-readable non-transitory recording medium, for example.

A program in which processing content to be executed by the exercise builder 2 is described may be recorded in various recording media. For example, the exercise builder management program to be executed by the exercise builder 2 can be stored in the storage device 13. The processor 11 loads at least a part of the program in the storage device 13 on the memory 12 and executes the loaded program.

Furthermore, the program (exercise builder management program) to be executed by the exercise builder 2 (processor 11) may be recorded in a non-transitory portable recording medium such as an optical disk 16a, a memory device 17a, or a memory card 17c. The program stored in the portable recording medium can be executed after being installed in the storage device 13, for example, by control from the processor 11. Furthermore, the processor 11 can directly read and execute the program from the portable recording medium.

The memory 12 is a storage memory such as a Read Only Memory (ROM) and a Random Access Memory (RAM). The RAM of the memory 12 is used as a main storage device of the information processing apparatus 2. The RAM temporarily stores at least a part of OS programs and control programs (cache control program) to be executed by the processor 11. Furthermore, the memory 12 stores various data needed for the processing by the processor 11.

The storage device 13 is a storage device such as a Hard Disk Drive (HDD), a Solid State Drive (SSD), or a Storage Class Memory (SCM), and stores various data. The storage device 13 is used as an auxiliary storage device of the exercise builder 2. The storage device 13 stores an OS program, a control program, and various data. The control program includes the exercise builder management program.

Note that a semiconductor storage device such as an SCM or a flash memory can be used as the auxiliary storage device. Furthermore, a Redundant Arrays of Inexpensive Disks (RAID) may be configured by using the plurality of storage devices 13.

The graphic processing device 14 is connected to the monitor 14a. The graphic processing device 14 displays an image on a screen of the monitor 14a according to a command from the processor 11. Examples of the monitor 14a include a display device using a Cathode Ray Tube (CRT), a liquid crystal display device, or the like.

The input interface 15 is connected to the keyboard 15a and the mouse 15b. The input interface 15 transmits signals transmitted from the keyboard 15a and the mouse 15b to the processor 11. Note that, the mouse 15b is an example of a pointing device, and another pointing device can also be used. Examples of the other pointing device include a touch panel, a tablet, a touch pad, a track ball, or the like.

The optical drive device 16 reads data recorded on the optical disk 16a using laser light or the like. The optical disk 16a is a non-transitory portable recording medium having data recorded in a readable manner by reflection of light. Examples of the optical disk 16a include a Digital Versatile Disc (DVD), a DVD-RAM, a Compact Disc Read Only Memory (CD-ROM), a CD-Recordable (R)/ReWritable (RW), or the like.

The device connection interface 17 is a communication interface for connecting peripheral devices to the exercise builder 2. For example, the device connection interface 17 can be connected to the memory device 17a and a memory reader/writer 17b. The memory device 17a is a non-transitory recording medium having a communication function with the device connection interface 17, and is, for example, a Universal Serial Bus (USB) memory. The memory reader/writer 17b writes data to the memory card 17c or reads data from the memory card 17c. The memory card 17c is a card-type non-transitory recording medium.

The network interface 18 is connected to the network. The network interface 18 exchanges data with the other information processing apparatus (attack side and defense side) via the network. Another communication device or the like may be connected to the network.

The other information processing apparatus (attack side and defense side) is connected to the network, and the exercise builder 2 (information processing apparatus 2) is communicably connected to the information processing apparatus (attack side and defense side) used by the participant (exercising person) of the cyber exercise via the network interface 18 and the network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
    a memory; and
    a processor coupled to the memory and configured to:
        receive information indicating a plurality of program components used to execute a cyber exercise and a relationship between the plurality of program components,
        generate a program group included in a scenario that controls execution of the cyber exercise by combining the plurality of program components based on the information indicating the relationship,
    acquire information specifying a first program component to be executed first among the plurality of program components based on the information indicating the relationship,
    set the acquired information as a trigger that activates a second program component subsequent to the first program component,
    set a component name to the first program component in a case where the component name is not set to the first program component, and
    set the set component name of the first program component as a trigger that activates an event corresponding to the second program component.

2. The information processing apparatus according to claim 1, wherein the processor is further configured to
    generate a program group including both of a first program executed by a first information processing terminal on an attack side in the cyber exercise and a second program executed by a second information processing terminal on a defense side in the cyber exercise.

3. A cyber exercise control method, comprising:

receiving information indicating a plurality of program components used to execute a cyber exercise and a relationship between the plurality of program components;

generating a program group included in a scenario that controls execution of the cyber exercise by combining the plurality of program components based on the information indicating the relationship;

acquiring information specifying a first program component to be executed first among the plurality of program components based on the information indicating the relationship;

setting the acquired information as a trigger that activates a second program component subsequent to the first program component;

setting a component name to the first program component in a case where the component name is not set to the first program component; and setting the set component name of the first program component as a trigger that activates an event corresponding to the second program component.

4. A non-transitory computer-readable storage medium storing a program that causes a processor included in an information processing apparatus to execute a process, the process comprising:

receiving information indicating a plurality of program components used to execute a cyber exercise and a relationship between the plurality of program components;

generating a program group included in a scenario that controls execution of the cyber exercise by combining the plurality of program components based on the information indicating the relationship;

acquiring information specifying a first program component to be executed first among the plurality of program components based on the information indicating the relationship;

setting the acquired information as a trigger that activates a second program component subsequent to the first program component;

setting a component name to the first program component in a case where the component name is not set to the first program component; and setting the set component name of the first program component as a trigger that activates an event corresponding to the second program component.

* * * * *